(12) United States Patent
Baumgart et al.

(10) Patent No.: US 11,030,776 B2
(45) Date of Patent: Jun. 8, 2021

(54) CALIBRATION OF A LIGHT-FIELD IMAGING SYSTEM

(71) Applicant: Molecular Devices (Austria) GmbH, Wals (AT)

(72) Inventors: Marcus Baumgart, Villach (AT); Tibor Bereczki, Treffen (AT); Jaka Pribosek, Sankt Magdalen (AT); Jan Steinbrener, Klagenfurt (AT); Andreas Tortschanoff, Villach (AT)

(73) Assignee: Molecular devices (Austria) GMBH

( * ) Notice: Subject to any disclaimer, the term of this patent is extended or adjusted under 35 U.S.C. 154(b) by 166 days.

(21) Appl. No.: 16/265,220

(22) Filed: Feb. 1, 2019

(65) Prior Publication Data

US 2020/0250856 A1   Aug. 6, 2020

(51) Int. Cl.
    *G06T 7/80*    (2017.01)
    *G06T 5/00*    (2006.01)
    *G06T 5/20*    (2006.01)

(52) U.S. Cl.
    CPC .............. *G06T 7/80* (2017.01); *G06T 5/003* (2013.01); *G06T 5/006* (2013.01); *G06T 5/20* (2013.01); *G06T 2207/10052* (2013.01); *G06T 2207/30208* (2013.01)

(58) Field of Classification Search
    CPC ........... G06T 5/003; G06T 5/006; G06T 5/20; G06T 7/80; G06T 2207/10052; G06T 2207/30208
    USPC ................................................. 382/106, 294
    See application file for complete search history.

(56) References Cited

U.S. PATENT DOCUMENTS

| 8,189,089 B1 * | 5/2012 | Georgiev ............. H04N 13/232 348/343 |
| 9,153,026 B2 | 10/2015 | Meng et al. |
| 2012/0300091 A1 * | 11/2012 | Shroff ................ H04N 5/22541 348/222.1 |

(Continued)

FOREIGN PATENT DOCUMENTS

| CN | 105488810 B | 4/2016 |
| DE | 10332161 B4 | 3/2015 |

(Continued)

OTHER PUBLICATIONS

Computer English Translation of Chinese Patent No. CN108364342 (Year: 2018).*

(Continued)

*Primary Examiner* — Daniel G Mariam
(74) *Attorney, Agent, or Firm* — Merchant & Gould P.C.

(57) ABSTRACT

Methods of calibrating a light-field imaging system, a light-field imaging system to perform the calibration methods, a calibration target for the calibration methods, and methods of projecting a light-field image into object space with a calibrated light-field imaging system. An exemplary calibration method is performed with a light-field imaging system including a microlens array and an image sensor. A z-stack of light-field images of a calibration target may be captured using the image sensor, while the calibration target is on the stage and located at a plurality of different z-positions. A total magnification of the imaging system and a microlens magnification of the microlens array may be determined from each light-field image of the z-stack.

20 Claims, 17 Drawing Sheets

(56) References Cited

U.S. PATENT DOCUMENTS

| | | | | |
|---|---|---|---|---|
| 2014/0146184 A1* | 5/2014 | Meng | ............... | H04N 17/002 348/187 |
| 2016/0091705 A1* | 3/2016 | Ben Ezra | ............. | G02B 21/367 348/79 |
| 2017/0205615 A1* | 7/2017 | Vaziri | ................ | G02B 21/367 |
| 2020/0241274 A1* | 7/2020 | Dai | ................ | H04N 13/106 |

FOREIGN PATENT DOCUMENTS

| | | |
|---|---|---|
| DE | 102013009634 | 7/2015 |
| EP | 3098779 A1 | 11/2016 |
| EP | 102015120965 | 4/2017 |

OTHER PUBLICATIONS

Computer English Translation of Chinese Patent No. CN108363197 (Year: 2018).*

Computer English Translation of Chinese Patent No. CN108363196 (Year: 2019).*

Dansereau, Donald G et al, "Decoding, Calibration and Rectification for Lenselet-Based Plenoptic Cameras", Australian Centre for Field Robotics; School of Aerospace, Mechanical and Mechatronic Engineering, University of Sydney, NSW, Australia, 2013.

Lin, Xing et al, "Camera Array Based Light Field Microscopy", Biomedical Optics Express, Sep. 1, 2015, vol. 6, No. 9.

'Georgi EV, Todor et al, "Resolution in Plenoptic Cameras", 2009 Optical Society of America.

Vaish, Vaibhav et al, "Using Plane+ Parallax for Calibrating Dense Camera Arrays", Stanford University, Stanford CA, 2004.

Zeller, Niclas et al, "Kalibrierung und Genauigkeitsuntersuchung einer fokussierten plenoptischen Kamera", Gemeinsame Tagung 2014 der DGfK, der DGPF, der GfGI und des GiN (DGPF Tagungsband 23/2014).

Zhang, Zhengyou, "A Flexible New Technique for Camera Calibration", IEEE Transactions on Pattern Analysis and Machine Intelligence, vol. 22, No. 11 Nov. 2000, pp. 1330-1334.

'Heinze et al., "Automated Robust Metric Calibration of Multi-Focus Plenoptic Cameras", IEEE Instrumentation and Measurement Technology Conference, 2015.

Johannsen et al., "On the Calibration of Focused Plenoptic Cameras", in Time-of-Flight and Depth Imaging, Springer-Verlag Berlin Heidelberg, 2013.

* cited by examiner

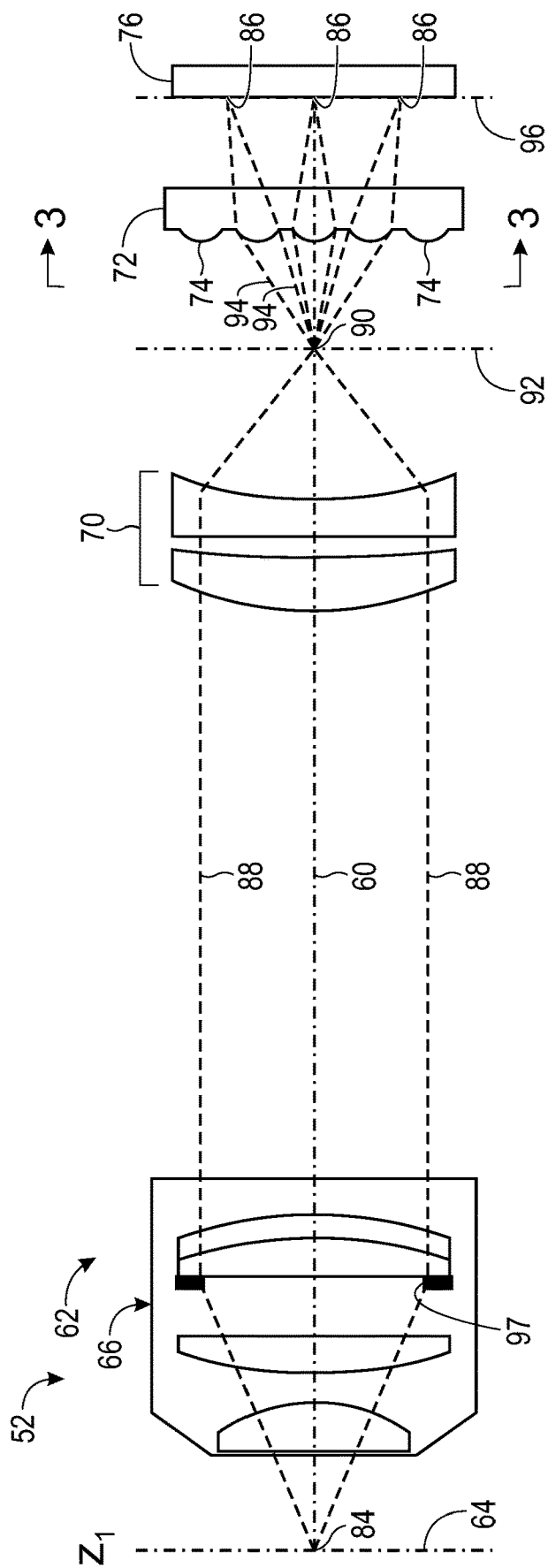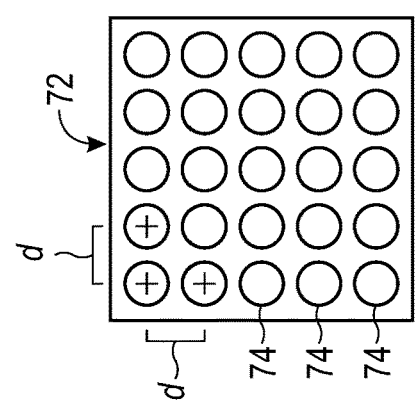

CALIBRATION OF A LIGHT-FIELD IMAGING SYSTEM

INTRODUCTION

A light-field microscope, in contrast to a conventional microscope, records multiple views of the same object from different angles in one light-field image. These recorded views allow the reconstruction of depth information for different parts of the object. The depth information enables various applications such as digital refocusing of a calculated two-dimensional projection or three-dimensional reconstruction of the object, neither of which is possible with the conventional microscope. However, such projections and reconstructions performed with a light-field microscope generally come with a trade-off of lower spatial resolution compared to conventional microscopy images.

A conventional microscope can be converted into a light-field microscope by replacing the conventional image sensor with a camera array or by inserting a microlens array in front of the image sensor. The use of a microlens array is often the preferred choice, due to its lower cost and ability to be retrofitted easily to existing conventional microscopes. Two configurations with distinct properties can be defined, depending on the position of the microlens array relative to the objective lens and the image sensor of the microscope. In the first configuration, dubbed "LF1.0," the microlens array lies in an intermediate image plane between the objective lens and the image sensor, and the image sensor lies in the back focal plane of the microlens array. In the second configuration, dubbed "LF2.0," these restrictions are removed and the microlens array can have an arbitrary location between the objective lens and the image sensor. Accordingly, in LF2.0 the location of the microlens array can be selected to optimize the desired performance criteria of the light-field microscope (e.g., lateral and axial resolution and depth of focus).

To be able to perform a quantitative reconstruction of three-dimensional object space (x,y,z) from a light-field microscope image, the relationship between object space and two-dimensional light-field space needs to be known for each microlens subimage $(x''_k, y''_k)$ of the light-field image. The mapping function is defined as $f: \vec{r} \to \vec{r}''_k$. In principle, the mapping function can be calculated based on values for geometric parameters of the experimental setup, such as the relative distances of the cardinal planes of relevant optical elements to the image sensor. In practice, the exact location of these cardinal planes is unknown and the relative distances inside the light-field microscope cannot be easily determined to the required accuracy. This lack of precise geometric information is more problematic for LF2.0 configurations, where there are no well-defined optical criteria for the positioning of the microlens array inside the light-field microscope (such as the intermediate image plane of the objective lens and the focal plane of the microlens array). In addition, optical effects of real lens systems (e.g., aberrations or errors caused by the lenses of the microlens array or other optical elements of the light-field microscope) can lead to deviations in the actual optical geometry compared to the assumed optical geometry measured externally. Apart from these inherent difficulties in determining the relevant geometry from external measurements, user-induced changes to the geometry (e.g., due to refocusing of the microscope or unintentional misalignment) can occur on a frequent basis. All deviations in the assumed geometry relative to the actual geometry will lead to errors in projection and reconstruction, resulting in incorrect depth information, loss of contrast, or a complete failure of the reconstruction.

Systems, methods, and apparatus are needed for calibration of a light-field microscope or camera that enables mapping between light-field space and object space.

SUMMARY

The present disclosure provides methods of calibrating a light-field imaging system, a light-field imaging system to perform the calibration methods, a calibration target for the calibration methods, and methods of projecting a light-field image of an object into object space using a calibrated light-field imaging system. An exemplary calibration method is performed with a light-field imaging system including a microlens array and an image sensor. A z-stack of light-field images of a calibration target may be captured using the image sensor, while the calibration target is located at a plurality of different z-positions. A total magnification of the imaging system and a microlens magnification of the microlens array may be determined from each light-field image of the z-stack.

BRIEF DESCRIPTION OF THE DRAWINGS

FIG. 2 is a ray diagram created with selected components of the light-field microscope of FIG. 1 and illustrating propagation of exemplary light rays from a point object located in a plane of object space, to a sensor plane in two-dimensional light-field space.

FIG. 3 is a front view of an exemplary microlens array for the light-field microscope of FIG. 2, taken generally along line 3-3 of FIG. 2.

DETAILED DESCRIPTION

Figure 1:
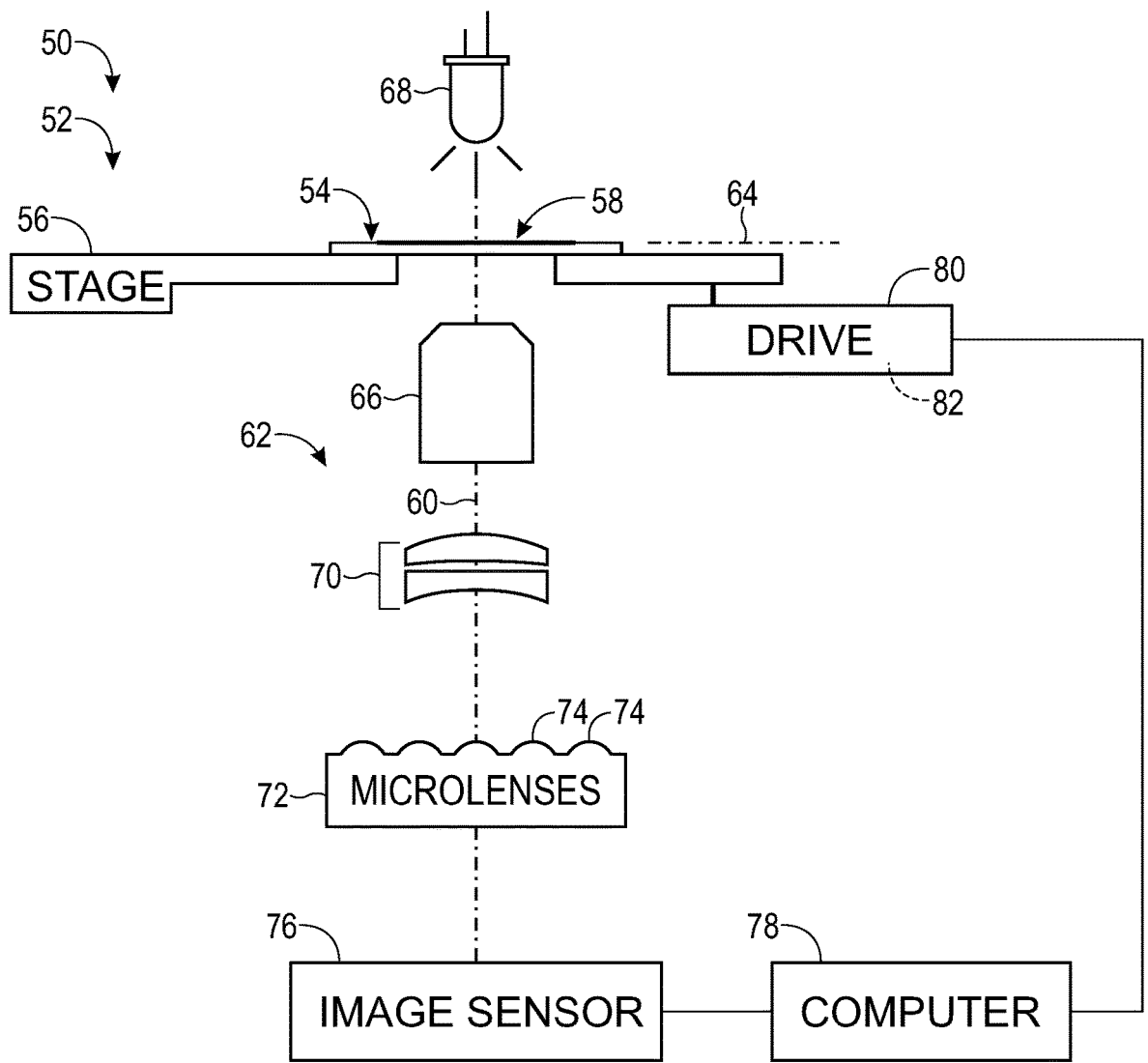
FIG. 1 is a schematic view of an exemplary light-field imaging system including a light-field microscope supporting an exemplary calibration target, as the light-field microscope is being calibrated.
Figure 4:
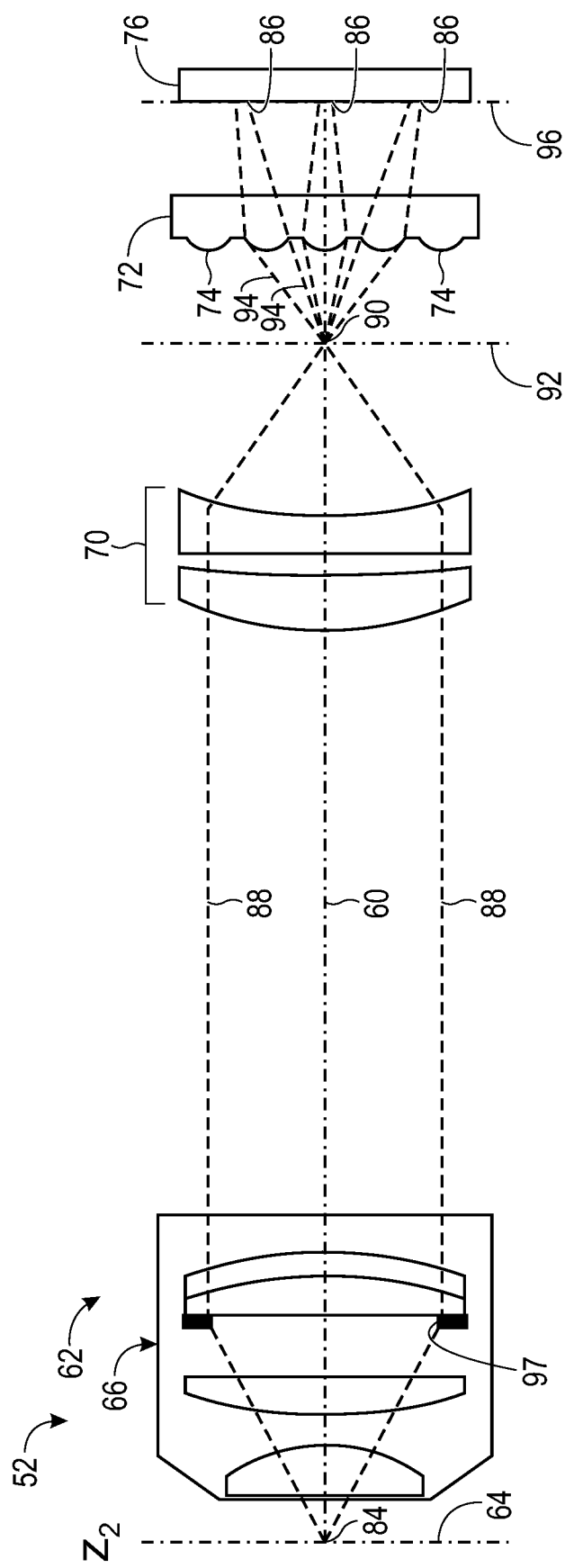
FIG. 4 is a ray diagram similar to the ray diagram of FIG. 2, except with the object plane having a z-position closer to an objective of the microscope.
Figure 5:
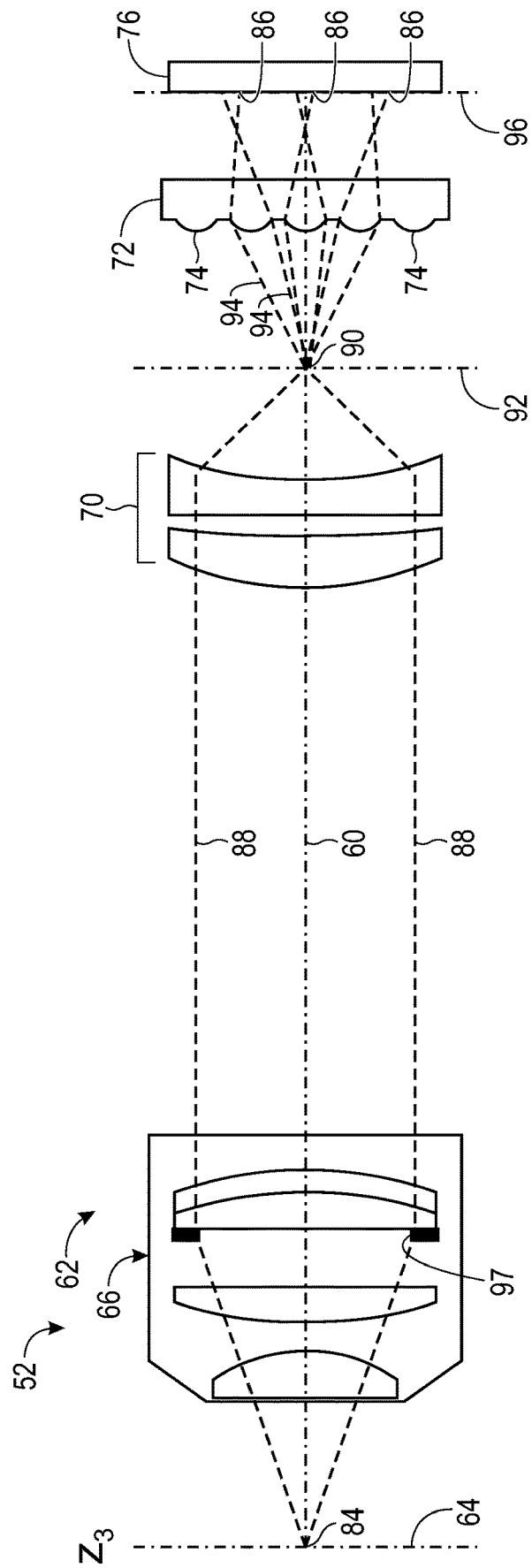
FIG. 5 is another ray diagram similar to the ray diagram of FIG. 2, except with the object plane having a z-position farther from the objective of the microscope.

The present disclosure provides methods of calibrating a light-field imaging system, a light-field imaging system to perform the calibration methods, a calibration target for the calibration methods, and methods of projecting a light-field image of an object into object space with a calibrated light-field imaging system. An exemplary calibration method is performed with a light-field imaging system including a microlens array and an image sensor. A z-stack of light-field images of a calibration target may be captured using the image sensor, while the calibration target is located at a plurality of different z-positions. A total magnification of the imaging system and a microlens magnification of the microlens array may be determined from each light-field image of the z-stack. The systems and methods disclosed herein may enable higher sample throughput and low-cost mapping and tracking of microscopic objects in three-dimensions.

Light-field (plenoptic) imaging allows the reconstruction of a three-dimensional object, or at least digital refocusing of the object, from a single light-field image. The prerequisite is to obtain precise light-field calibration information. The present disclosure provides a procedure, as an algorithm, to automatically calibrate the light-field characteristics of a light-field imaging system, even when the imaging system has "black box" optics. A mapping function and a simple, yet accurate calibration of the optical path of a light-field imaging system to enable use of the mapping function are provided. The calibration can be automated, and thus can be repeated as needed to always have a correct geometry as a basis for high quality reconstruction of objects (e.g., samples of interest) using the mapping function.

Calibration approaches are available for light-field photography performed with an array of separate cameras, but the experimental circumstances and challenges of light-field microscopy differ significantly. First, in contrast to light-field photography, the image-forming geometry from the object to the image plane is relatively fixed in microscopy. This geometry can only change within a predefined range that is largely determined by the mechanical structure of the microscope (mostly through changing the distance between the object and the objective). Since modern microscopes are equipped with high-precision xyz-stages for adjusting this object-objective distance, any particular measurement geometry of a given microscope can be reproduced repeatedly with high accuracy for the microscope. Second, spatial resolution in the object plane needs to be much higher for microscopy than photography. At the same time, the field of view and the depth of focus is much smaller in microscopy compared to photography. This means that the size of the object volume that needs to be calibrated is much smaller in microscopy, but also that the quality of the calibration needs to be much higher. Third, in a typical microscope geometry, the object sits close to the front focal plane of the objective. This leads to a highly non-linear relationship between object magnification and object-objective distance (also called the z-position of the object). This axial dependency of the magnification needs to be taken into account during calibration.

The present disclosure provides a simple, yet elegant calibration concept primarily aimed at light-field microscopy and light-field macro photography. The concept permits calibration using measured light-field data of a suitable calibration target, and a value(s) for the pitch of the microlens array. From light-field images of the calibration target, the total magnification of the system, as well as the magnification due to the microlens array alone, can be determined for a series of different z-positions of the calibration target. Values for these magnifications can uniquely determine the mapping geometry between three-dimensional object space and two-dimensional light-field space. The characteristics of the microlens array in the imaging path, as well as the interplay of the microlens array with the entire imaging system, may be calibrated in three dimensions to enable tracing of optical rays back to their origin in object space.

The methods of the present disclosure can be used with light-field imaging systems having different light-field configurations (e.g., of types LF1.0 and LF2.0). In particular, the methods apply to light-field imaging systems having non-telecentric geometries, where the magnification depends on the distance of the transverse object plane to the objective (i.e., the z-position of the object plane). The methods can be used to determine values of the global parameters for the mapping function, but also to correct for any local aberrations, such as those caused by lens errors. Since calibration data can be captured (i.e., recorded) and analyzed in an automated fashion for a series of z-positions, the methods can be used repeatedly, as needed, to determine and adapt to any changes in the optical geometry of the system.

The methods disclosed herein can be applied to light-field imaging systems constructed to perform light-field photography of macroscopic objects, provided that the parameters of the calibration target are adapted accordingly, and that a suitable calibration stage for reproducible z-positioning is employed. The calibration stage is generally needed for accurately adjusting the distance of the calibration target to the light-field camera within the volume of interest in object space. For practical reasons, besides use in light-field microscopy, the methods may be most suitable for relatively close-up, macro photography, where the axial length of the volume of interest in object space is typically less than about 1 to 100 centimeters.

The methods disclosed herein can be used for all wavelength regimes where lens-based light-field systems are feasible. For example, the wavelength regimes can include optical radiation that is ultraviolet, visible, near infrared, or the like.

The present disclosure describes a calibration method that determines values for system parameters required for projection and object reconstruction from light-field images. The method may utilize a dedicated calibration target, which may include the superposition of two periodic patterns. With the calibration target, values for local parameters required for object reconstruction can be determined from captured light-field images of the calibration target. From the local values, values for global parameters can be calculated to high precision through averaging of the values for local parameters, as well as local aberrations due to optical artifacts.

The calibration method may directly measure the relevant parameters of a mapping function that relates three-dimensional object space to two-dimensional light-field space. The parameters may include total magnification and magnification due to the microlens array, over the entire range of z-positions of interest in object space. The calibration method also may measure radial distortion for at least one microlens (e.g., a respective radial distortion for each of a plurality of microlenses of a microlens array and/or an average radial distortion for the microlens array) and/or a point spread function (e.g., a respective point spread function for each of a plurality of microlenses and/or an average point spread function for the microlens array). All of this information may be extracted from captured light-field images without any prior assumptions about the explicit configuration of the system's optics (such as the types of optical elements in the system, their optical parameters, and their relative distances to each other), other than the pitch of the microlens array. The information also may be extracted without the need for iterative optimization processes to determine the free parameters of a complicated optical model.

The total system magnification, and the magnification of the microlens array, can be measured from the same light-field image, even if these magnifications have significantly different absolute values. Only light-field images have to be evaluated; no other images at other positions in the beam path (e.g., in the intermediate image plane in front of the microlens array) have to be recorded. In other words, the whole light-field imaging system can be treated as a black box.

The methods disclosed herein capture light-field images of the calibration target, with the calibration target located at several z-positions (e.g., more than two). These z-positions, also called axial positions, may be known relative to one another with sufficient accuracy to determine the nonlinear dependence of total and microlens magnifications as a function of z-position. The accuracy of the z-positions is generally better than the desired axial resolution for reconstruction of an object in object space. In principle, this potential restriction does not constitute a disadvantage for light-field microscopy since microscope systems are usually equipped with precision xyz-stages.

The methods and systems disclosed herein may enable rapidly determining the structure of three-dimensional cell clusters (e.g., spheroids, organoids) in screening applications. Currently, the throughput of these screening applications is limited by the time needed to acquire a z-series of images (generally more than ten images) at each site of interest. Throughput is limited even more if a confocal microscope is employed to image a three-dimensional volume at the site. In contrast, the methods and systems of the present disclosure, after calibration, can generate three-dimensional information about a cell cluster from a single light-field image.

Further aspects of the present disclosure are described in the following sections: (I) definitions, (II) light-field imaging systems, (III) geometrical mapping between object space and light-field space, (IV) calibration targets to enable geometrical mapping, (V) methods of calibration and mapping, and (VI) examples.

I. Definitions

Technical terms used in this disclosure have meanings that are commonly recognized by those skilled in the art. However, the following terms may be further defined as follows.

Computer—an electronic device for storing and processing data, typically in binary form, according to instructions, which may be provided by a variable program. Exemplary computers, also called computing devices, include desktop computers, laptop computers, tablets, smartphones, and the like.

Examination region—a volume intersected by an optical axis of a light-field imaging system in which an object, such as a calibration target or a sample (e.g., biological cells), can be imaged with an image sensor.

Feature—a marker of a calibration target, or the absence of a marker at a position precisely definable by extrapolation and/or interpolation with respect to an organized set of markers of the calibration target.

Image—an optical or digital representation of an object and/or field of view. The representation, if optical, may be formed by light at a plane in space (e.g., an intermediate image plane) or on a surface (e.g., of an image sensor), among others. The representation, if digital, may be a raw light-field image captured by an image sensor, a processed form thereof, or a two-dimensional or three-dimensional image in object space created using at least one light-field image.

Image sensor—an optical sensor capable of detecting spatial variations (e.g., variations in intensity) of light in two dimensions, where the light is incident on a photosensitive detection area of the sensor. The image sensor may be a two-dimensional array sensor, such as a charge-coupled device (CCD) sensor, an active pixel sensor (e.g., a complementary metal-oxide-semiconductor (CMOS) sensor), a hybrid CCD-CMOS sensor, or the like. The image sensor may create a raster image (i.e., a bitmap) as a rectangular array of pixels, and may be configured to create color images, grayscale (monochromatic) images, or both.

Lens array—a two-dimensional array of lenses. Exemplary lenses that may be suitable within the array for light-field microscopy are microlenses, namely, lenses each having a diameter of less than about one millimeter. Exemplary microlens diameters that may be suitable for a microlens array include less than about 750, 500, 400, 300, 200, or 100 micrometers, among others, for each microlens. Exemplary lens diameters for light-field macro photography include lenses having diameters of at least one millimeter, or in some cases, lenses that are microlenses as described above.

The array may have any suitable properties. The pitch (lens-to-lens spacing) of the array may (or may not) be similar to the lens diameter, such as no more than about 50%, 25%, 20%, or 10% greater than the lens diameter. The lenses may form a rectangular grid or hexagonal grid, among others. The array may contain any suitable number of lenses, generally at least four. In some embodiments, the array may contain at least 25, 50, or 100 lenses, among others. For example, the array may contain at least 2, 3, 4, 5, 6, 7, or 10 lenses along each of a pair of orthogonal axes defined by the array. The lenses of an array may be substantially identical to one another in size and/or shape, or may differ in size and/or shape. Furthermore, the array may be an integrated unit, and/or the lenses of the array may be formed integrally with one another.

Light—optical radiation, including ultraviolet radiation, visible radiation (i.e., visible light), and/or infrared radiation.

Light-field image—an optical image formed with light by a microlens array on an image sensor and composed of a two-dimensional array of subimages corresponding to microlenses of the array, or a captured (digital) form thereof. The subimages generally do not overlap one another significantly, if at all. The subimages may or may not be substantially in focus.

Light source—a device that generates light, optionally as a beam of light, and optionally powered by electricity. A light source includes at least one light-emitting element and also may include any associated optical element(s) to shape, size, filter, polarize, scatter, direct, and/or otherwise interact with light emitted by the light-emitting element(s). These optical elements may include any combination of at least one waveguide (e.g., a fiber optic or liquid light guide), lens, mirror, filter, diffuser, mask, aperture, beam-splitter, grating, prism, polarizer, and/or the like. Exemplary light-emitting elements include a semiconductor device, laser (e.g., excimer laser, gas laser, dye laser, solid-state laser, semiconductor crystal or diode laser, free electron laser, etc.), arc lamp, and/or the like. Exemplary semiconductor light-emitting elements include laser diodes, light-emitting diodes (LEDs), and superluminescent diodes, among others.

Objective—a single optical element or a combination of optical elements that gathers light from an object and/or field of view and focuses the gathered light. The objective, as used herein, may include each optical element located along the optical axis between an examination region and a microlens array of a light-field imaging system.

Optics—a set of optical elements of an imaging system, which may be arranged along an optical path between a light source and an examination region (illumination optics) and/or along an optical axis between the examination region and an image sensor (collection optics). An optical element may be any device or structure that interacts with light, such as to collect, direct, focus, filter, polarize, scatter, collimate, and/or partially block light. An optical element may function by any suitable mechanism, such as reflection, refraction, scattering, diffraction, absorption, and/or filtering, among others. Exemplary optical elements include lenses, mirrors, diffusers, gratings, prisms, filters, apertures, masks, beam-splitters, waveguides, polarizers, and the like.

Pinhole—a hole or opening having a diameter or width of less than about one millimeter. Exemplary pinholes that may be suitable for creating features of the calibration targets disclosed herein have a diameter or width of less than about 100, 50, 20, or 10 micrometers, among others. A pinhole may have any suitable shape. For example, the pinhole may be circular, rectangular, or the like.

Sample—a specimen having any suitable properties. The sample may be organic and/or inorganic, natural and/or manufactured, and may include any suitable assembly, material, substance, isolate, extract, particles, or the like. In exemplary embodiments, the sample includes biological cells (such as isolated cells or one or more clusters of cells). The biological cells may be eukaryotic (e.g., mammalian cells) or prokaryotic (e.g., bacterial cells). Exemplary biological cells include established cells (cell lines), primary cells, cells of a tissue sample, transfected cells, cells from a clinical sample (e.g., a blood sample, a fluid aspirate, a tissue section, etc.), clones of cells, and/or the like. The cells may be contained by a sample holder, optionally in contact with (e.g., immersed in) any suitable liquid medium. The liquid medium may be an aqueous medium, which may include water, salt, buffer, glucose, detergent, dye, protein, amino acids, or any combination thereof, among others. The liquid medium may be a growth medium for the cells.

Sample holder—a device for holding at least one sample or any array of spatially isolated samples, and optionally permitting the sample(s) to be imaged through a horizontal, transparent wall of the device (e.g., the bottom wall of a well). Exemplary sample holders for light-field microscopy include microplates, culture dishes, culture flasks, slides, flow chips, etc.

z-stack of light-field images—a series of light-field images of an object (e.g., a calibration target) captured while the object is located at different z-positions in object space, optionally without changing the lateral position of the object in object space.

z-position—one of the locations along an optical axis of a light-field imaging system at which an object can be disposed. The z-position can be defined as the distance between the object and an objective of the light-field imaging system, measured parallel to the optical axis, and can be changed by moving the object or the objective parallel to the optical axis.

II. Light-Field Imaging Systems

This section provides an overview of light-field imaging systems of the present disclosure, as exemplified by a light-field imaging system 50; see FIGS. 1-5.

Light-field imaging system 50 includes a light-field microscope 52 (or a light-field camera for light-field macro photography) and a calibration target 54. Light-field microscope 52 (and/or the light-field camera) has a stage 56 to support either calibration target 54 or other object of interest (e.g., a sample holder containing one or more samples). The calibration target or other object is supported in an examination region 58, on an optical axis 60 defined by an objective 62. Calibration target 54 may define an object plane 64 (an xy plane) that is orthogonal to optical axis 60 (a z-axis) when the calibration target is operatively supported by stage 56, and which may be located near a front focal plane of objective 62 (particularly a light collection module 66 thereof). Calibration target 54 may be illuminated with optical radiation (e.g., visible light) generated by a light source 68, and only a spatially-restricted portion of the optical radiation may be transmitted to collection module 66 of objective 62 by calibration target 54. The transmitted optical radiation may, for example, propagate through collection module 66, an optional tube lens 70, and a microlens array 72 having any suitable number of microlenses 74 arranged in a two-dimensional array. Individual microlenses 74 of microlens array 72 may at least partially focus the optical radiation onto an image sensor 76, to form individual subimages each corresponding to a different one of the microlenses. Image sensor 76 captures a light-field image of the subimages, which is communicated to a computer 78 for processing (e.g., see Sections III-VI, among others). In other embodiments (e.g., for light-field macro photography), microlens array 72 may be replaced by a lens array composed of lenses that are not necessarily microlenses. In other embodiments, calibration target 54 may reflect or emit light that forms the light-field image.

Light-field microscope 52 permits adjustment of the z-position of calibration target 54 along optical axis 60 via a drive mechanism 80. More specifically, the drive mechanism can operate to change the distance between calibration target 54 and light collection module 66 along optical axis 60. Accordingly, drive mechanism 80 may be coupled to stage 56, as shown in FIG. 1, to drive movement (e.g., vertical movement) of the stage while the z-position (e.g., the elevation) of collection module 66 remains fixed. Alternatively, drive mechanism 80 may be coupled to collection module 66 (and/or objective 62), to drive movement (e.g., vertical movement) of collection module 66 (and/or objective 62) while the z-position (e.g., the elevation) of stage 56 remains fixed. Drive mechanism 80 may include a motor 82 (or may be driven manually), and may be controlled by computer 78 for z-positioning during performance of a fully-automated calibration method.

Optical axis 60 may have any suitable orientation and properties. The optical axis is typically vertical at collection module 66, and may extend vertically upward (as shown here) or vertically downward through examination region 58 and object plane 64 (and a calibration target 54 or other object disposed therein) from collection module 66. In other words, light-field microscope 52 may have an inverted configuration, with collection module 66 below examination region 58, as shown here, or a non-inverted configuration, with collection module 66 above examination region 58. However, in other embodiments, optical axis 60 may be horizontal or oblique (neither substantially horizontal nor substantially vertical) at collection module 66. Optical axis 60 may be non-folded, as shown here, or may be folded (e.g., with a mirror) at one or more sites along the optical axis.

Light source 68 may be arranged to provide any suitable illumination of examination region 58 with any suitable light source (e.g., see Section I). The illumination may be trans-illumination (as shown here), epi-illumination, oblique illumination, or a combination thereof, among others. Any suitable optical element(s) may be operatively positioned on an illumination path between light source 68 and examination region 58, to direct and/or condition optical radiation generated by the light source upstream of the examination region. Exemplary optical elements located in the illumination path may include a diffuser, a spectral filter, a collimating lens or mirror, a fold mirror, collection module 66, a light guide, and/or the like.

FIG. 2 shows a ray diagram with only selected components of light-field microscope 52. The diagram depicts how optical radiation may propagate from an object point 84 in object plane 64 of object space to a plurality of separate light-field image points/spots 86 on image sensor 76. The optical radiation is represented by upstream marginal light rays 88 extending from object point 84 to an intermediate point 90 in an intermediate image plane 92, and downstream marginal light rays 94 extending from intermediate point 90 to a sensor plane 96 defined by image sensor 76 in two-dimensional light-field space. In this exemplary configuration, object plane 64, intermediate image plane 92, and sensor plane 96 are conjugate with one another, such that optical radiation is focused precisely to light-field image points 86.

A plan view of an exemplary microlens array 72 is shown in FIG. 3. Microlenses 74 may be arranged in a two-dimensional array. The microlenses may be distributed along a pair of orthogonal axes in the plane of the array to define a rectangular grid, as shown, although a non-rectangular arrangement of microlenses may be used. In some embodiments, microlenses 74 may be uniformly spaced from one another along each orthogonal axis of the pair of axes, and optionally may have the same spacing from one another, pitch d, along both axes, as shown.

The distance between image points 86 may be greater than the spacing of microlenses 74 (e.g., pitch d in FIG. 3) due to parallax (see FIG. 2). Optical radiation from intermediate point 90 may be incident on at least a subset of individual microlenses 74 of microlens array 72 at a different angle for each microlens. In other words, each chief ray propagating from intermediate point 90 through each microlens of the subset has a different orientation. The optical radiation from intermediate point 90 may be incident on only a subset of the microlenses of microlens array 72, as shown, because the cone size of optical radiation propagating from intermediate point 90 may be limited by an aperture (e.g., stop element 97) located upstream (e.g., in light collection module 66). (However, light-field microscope 52 generally has a non-telecentric optical configuration, such that magnification varies with the distance from collection module 66.) As object point 84 is moved sufficiently laterally in object plane 64, a different subset of the microlenses may receive optical radiation from object point 84. Accordingly, a set of sufficiently spaced object points 84 in object plane 64 may be imaged by different subsets of the microlenses, and may have conjugate points/spots in different subsets of subimages in a light-field image captured by image sensor 76. In other cases, the distance between image points 86 may be less than the physical spacing of microlenses 74 (e.g., pitch d in FIG. 3). For example, in a hypercentric, Galileo-type setup, the pitch of the projected images of the microlens on the image sensor may be smaller than the physical pitch of the microlens array. Likewise, in this setup, the distance between image points 86 is smaller than the (projected and physical) pitch of the microlens array.

Objective 62 of light-field microscope 52 shown in FIG. 2 collimates optical radiation upstream with an infinity-corrected collection module 66, and focuses the collimated radiation with a downstream tube lens 70. In other embodiments, tube lens 70 may be eliminated, and the optical radiation may, for example, be both collected and focused with collection module 66.

In some embodiments, the stage may be replaced by a manual contraption to hold the calibration target or other object at different z-positions. For example, the user may set and adjust the z-position with one or more spacers of known size placed manually on top of the objective. Each spacer may, for example, be about 5, 10, 15, 20, 25, 30, 40, 50, or 100 micrometers thick, among others.

FIG. 2 shows object plane 64 located at z-position $z_1$, which is precisely conjugate to sensor plane 96. However, this precise relationship for the location of an object is not required. More particularly, light-field images suitable for the methods of the present disclosure may be captured by image sensor 76 for an object plane 64 located closer to collection module 66 at z-position $z_2$ and farther from collection module 66 at z-position $z_3$ (see FIGS. 4 and 5, respectively). In either case, optical radiation from intermediate point 90 is less focused at sensor plane 96 than in FIG. 2, such that image points 86 of FIG. 2 become larger image spots in FIGS. 4 and 5.

Further exemplary aspects of light-field imaging system 50, light-field microscope 52 (or a light-field macro photography system), and calibration target 54 that may be suitable are described elsewhere herein, such as in Sections I and III-VI.

III. Geometrical Mapping Between Object Space and Light-Field Space

Figure 6A:
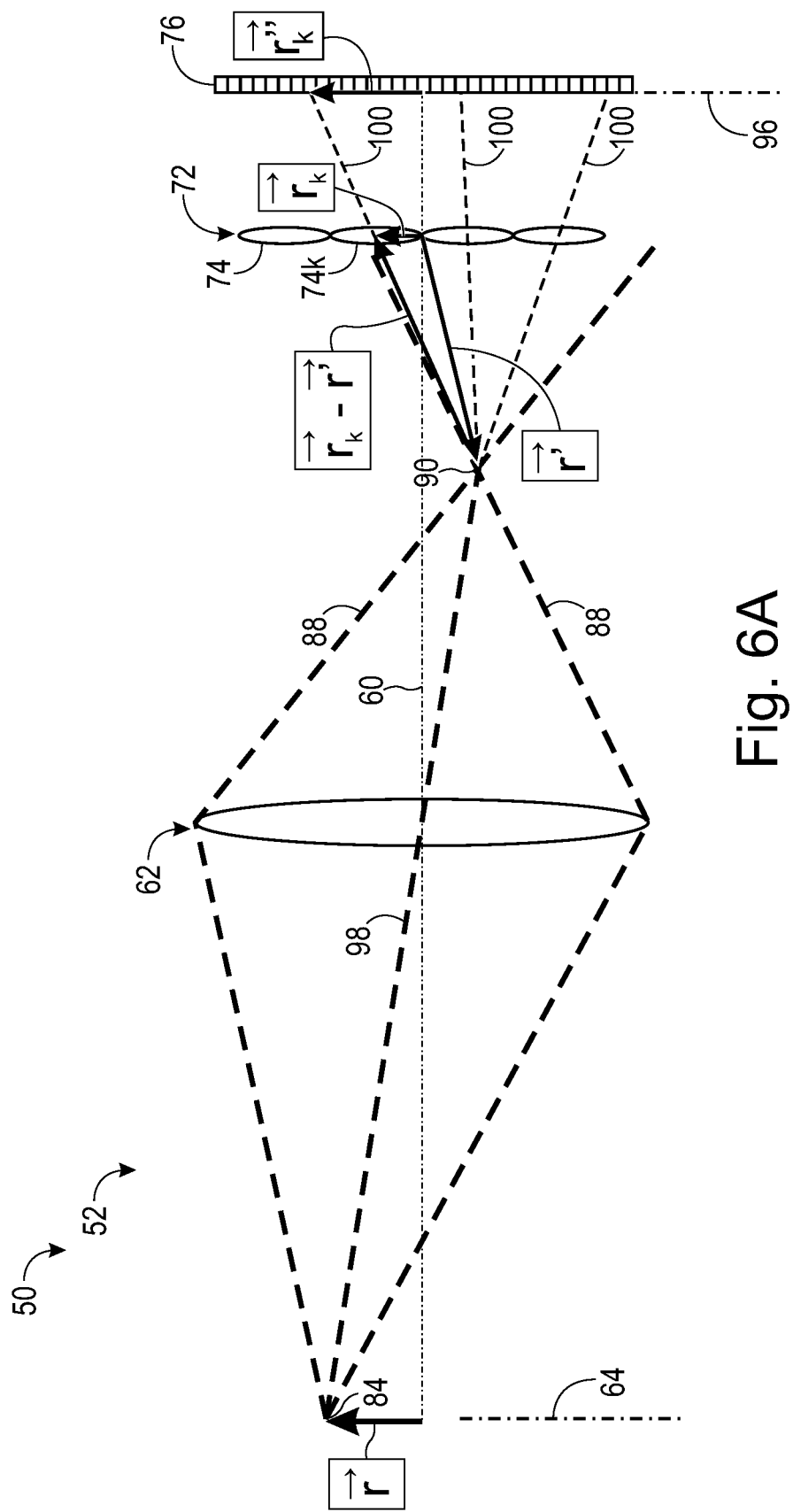
FIG. 6A is a schematic view of a light-field microscope and illustrating with representative rays the imaging of a real inverted image by a microlens array, and also illustrating the basis for a mapping function that relates a point in object space to a plurality of points in light-field space.
Figure 6B:
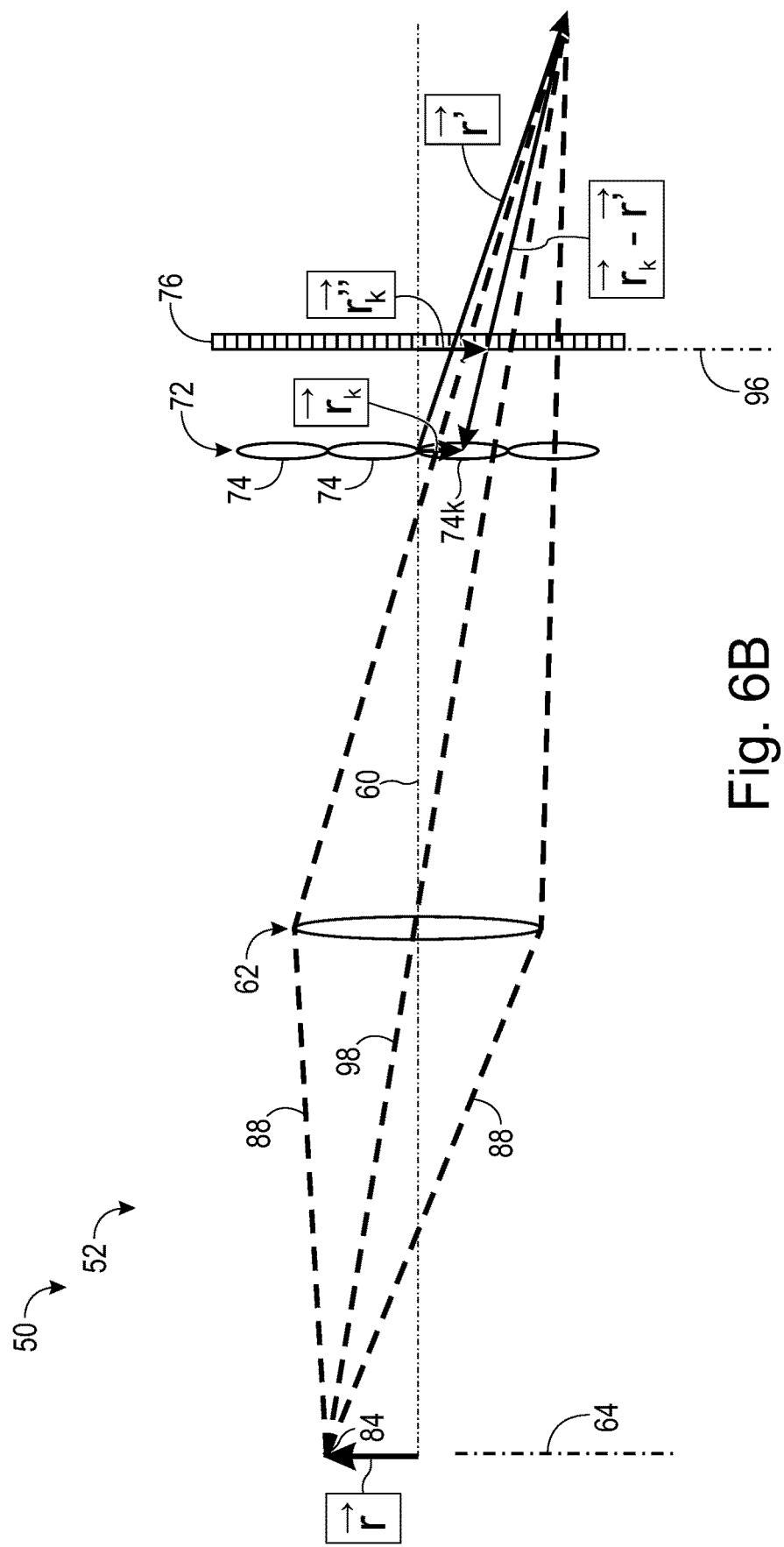
FIG. 6B is another schematic view of a light-field microscope and illustrating with representative rays the imaging of a virtual inverted imaged by a microlens array, and also illustrating the basis for a mapping function that relates a point in object space to a plurality of points in light-field space.

This section describes the basis for a geometrical mapping function relating object space and light-field space to one another for an object plane at a given z-position along the optical axis; see FIGS. 6A and 6B. The mapping function may be used with a light-field microscope or a light-field macro photography system, among others.

Light-field microscope 52 of FIGS. 6A and 6B may be constructed as in FIGS. 1 and 2 but is depicted in a somewhat different form. Objective 62 is shown as a single lens, instead of a separate collection module and tube lens, and microlens array 72 is shown in a more stylized form. These simplifications emphasize that, except for the relevant parameters described below, the objective and microlenses can have a "black box" construction otherwise. Moreover, one of microlenses 74, which has been selected to illustrate mapping, has been labeled as the k-th microlens, "74k." Object point 84 is located in object plane 64 as in FIGS. 2, 4, and 5, but is laterally offset from optical axis 60 (compare with FIG. 2). Marginal rays 88 and a chief ray 98 extend from object point 84, through objective 62, to intermediate point 90. The marginal rays are shown extending downstream of image point 90, to indicate boundaries of the cone of optical radiation incident on microlens array 72 from object point 84. Chief ray 98 is shown as ending prematurely at intermediate point 90 in FIG. 6A to reduce the complexity of the drawing downstream from intermediate point 90.

A mapping function relating three-dimensional object space to two-dimensional light-field space can be defined with respect to microlens 74k as follows:

$$r''_{k,xy} = M_{Total} \cdot r_{xy} + r_{k,xy}(1 - M_{ML}) \quad (1)$$

Where the subscript xy indicates the lateral components of the associated vector. This equation holds irrespective of whether the imaging system displays an inverted image or not and whether the microlens array images a real (inverted or not inverted image) or a virtual image (inverted or not inverted). The presence or absence of inversion is contained in the sign of the corresponding magnification value as described below.

A schematic of the mapping geometry for Equation 1 is shown in FIGS. 6A and 6B, which respectively illustrate the imaging of a real inverted image and a virtual inverted image by the microlens array. The vector $\vec{r}$ is a vector representing object point 84 in object plane 64 of three-dimensional object space, $\vec{r}_k$ is a vector representing the position of the optical axis of microlens 74k, $M_{Total}$ is the total magnification of the system (e.g., produced by a combination of objective 62 and microlens array 72), $M_{ML}$ is the magnification due to microlens array 72 alone, and $\vec{r}''_k$ is a vector representing a point in two-dimensional light-field space (sensor plane 96) corresponding to $\vec{r}$ in object space. Further aspects of mapping with Equation 1, from a light-field image to object space, to create a forward-projected image, are described below in Sections IV-VI.

Each of vectors $\vec{r}$, $\vec{r}_k$, and $\vec{r}''_k$ has a tail at optical axis 60. However, the optical axis used for mapping does not have to be the actual optical axis, but instead may be defined from a light-field image as a virtual, global optical axis, as described elsewhere herein (e.g., see Section V). Downstream chief rays 100 extend from intermediate image point 90, through at least a two-dimensional subset of microlenses 74, to a corresponding number of light-field image points on image sensor 76, as described above for FIGS. 2, 4, and 5. One of chief rays 100 passes through microlens 74k and is incident on sensor plane 96 at $\vec{r}''_k$.

Equation 1 can be derived as follows. Object point $\vec{r}$ in object plane 64 maps to an intermediate image point 90, represented by vector $\vec{r}'$, according to Equation 2:

$$r'_{xy} = M_{Objective} \cdot r_{xy} \quad (2)$$

Where $M_{Objective}$ is the collective magnification provided by objective 62 of light-field microscope 52 at intermediate object plane 64 and $\vec{r}'_{xy}$ are the lateral components of vector $\vec{r}'$. In the case of FIGS. 6A and 6B, $M_{Objective}$ will be a negative number.

Intermediate image point $\vec{r}'$ maps to $\vec{r}''_k$ of two-dimensional light-field space (i.e., sensor plane 96) via microlens 74k according to Equation 3:

$$r''_{k,xy} = r_{k,xy} + M_{ML}(r'_{xy} - r_{k,xy}) \quad (3)$$

In the case of FIG. 6A, $M_{ML}$ will be negative since it will invert again the real image produced by the microscope, whereas in the case of FIG. 6B, $M_{ML}$ will be a positive number.

Equation 3 can be rearranged and regrouped to produce Equations 4 and 5:

$$r''_{k,xy} - r_{k,xy} = M_{ML} \cdot r'_{xy} - M_{ML} \cdot r_{k,xy} \quad (4)$$

$$r''_{k,xy} = r_{k,xy}(1 - M_{ML}) + M_{ML} \cdot r'_{xy} \quad (5)$$

Substituting for $\vec{r}'$ in Equation 5 according to Equation 2 yields Equation 6:

$$r''_{k,xy} = r_{k,xy}(1 - M_{ML}) + M_{ML} \cdot M_{Objective} \cdot r_{xy} \quad (6)$$

Magnification within light-field microscope 52 can be described by Equation 7:

$$M_{Total} = M_{Objective} \cdot M_{ML} \quad (7)$$

Substituting within the righthand term of Equation 6 according to Equation 7 yields Equation 1.

The mapping geometry is sufficiently defined once the total magnification and the microlens magnification are known (e.g., measured). In general, each of these magnifications depends on the distance between object plane 64 and collection module 66 (i.e., the z-position of object plane 64). Local aberrations (e.g., due to the microlens array) can be expressed by a total magnification that varies with each microlens image. This leads to Equations 8 and 9:

$$M_{Total} = M_{Total}(z, x''_k, y''_k) \quad (8)$$

$$M_{ML} = M_{ML}(z) \quad (9)$$

The magnification due to the microlens array can be determined with a calibration target by evaluating the parallax (also called the virtual depth) between neighboring views of the same object point of the calibration target using Equation 10:

$$M_{ML}(z) = \frac{x_1''(z) - x_2''(z) - d_{MLA}}{d_{MLA}} \quad (10)$$

Where $d_{MLA}$ is the pitch of the microlens array and $x''_i(z)$ is the (z-dependent) position of the common object point in the image of the i-th microlens. In order to determine the correct sign of $M_{ML}$, one has to know whether the microlens array is placed upstream or downstream of the image plane of the microscope image plane. In the first case, the microlens array images a virtual image, and in the second case a real image. In general, this does not restrict the applicability of the approach since the location of the microscope image plane is either located at the native image sensor position or can be easily by moving the image sensor with respect to the microlens array along the z-axis downstream of the microscope objective. Note that the sign of $M_{Total}$ can also vary depending on the inversion properties and associated signs of $M_{Objective}$ and $M_{ML}$. However, a sign change in the total magnification only leads to an inversion in object space that is, in general, not relevant. In other words, one only needs to know whether the microlens array is inserted between the native image plane of the microscope and the upstream optics, or downstream of the native image plane. It is not necessary to know the exact distance between the microlens array and the native image plane.

Further aspects of exemplary calibration targets and use of the calibration targets to measure total and microlens magnification values, radial distortion values, and point spread functions are described further below in Sections IV-VI.

IV. Calibration Targets to Enable Geometrical Mapping

This section describes exemplary calibration targets, as exemplified by an embodiment 102 of calibration target 54; see FIGS. 7, 8A, 8B, and 9.

Calibration target 54 may include at least one optically-detectable marker located in and/or on a background layer. The at least one marker and the background layer differ from one another for at least one optical property, such as transmissivity, reflectivity, photoluminescence, and/or the like. For example, each marker may be substantially more transmissive, reflective, and/or photoluminescent than the background layer, in response to illumination with optical radiation from a light source of the light-field imaging system, to allow the marker to be optically distinguished from the background layer. Each marker or marker-defined feature interchangeably may be called a fiducial.

In some embodiments, the calibration target may include a plurality of optically-detectable markers arranged in a two-dimensional array that is parallel to a plane defined by the background layer. The markers may be a single type, or at least two types that are optically distinguishable from one another in the light-field imaging system, such as by size, shape, and/or an optical property.

At least a subset of the markers may be arranged along a plurality of parallel lines and/or along a plurality of non-parallel lines (e.g., lines that are orthogonal to one another), to form a grid. Accordingly, the at least a subset of the markers may define a grid and/or may be arranged with their centers at nodes of a grid. The grid may be rectangular or hexagonal, among others. The period (i.e., the spacing) between adjacent nodes of the grid may be uniform along at least one axis of the grid and/or along a pair of non-parallel (e.g., orthogonal) axes defined by the grid. Markers of the same first type (e.g., having the same size and/or shape) may be located at only a subset of the nodes within the grid to create a first repeat structure having a first period. A marker of a second type or no marker may be present at other nodes within the grid, to define a second repeat structure having a second period. The second period may be an integer multiple of the first period.

Each marker may have any suitable size and shape, and the markers collectively may define any suitable spacing(s) and/or period(s). The size of each marker may be defined and known. Exemplary marker sizes include a width and/or diameter of less than about 100, 50, 25, 20, 15, 10, 5, or 2 micrometers, among others. The size of at least one type of marker may be less than a period defined by the marker, for example, with the period being at least 2, 3, or 4 times the size.

Each marker may have any suitable structure formed by any suitable process. The marker may be an opening, such as a pinhole or slit, in the background layer. The opening may be created in the background layer by material removal, such as laser drilling (e.g., laser-induced forward transfer), photolithography, or the like. In other embodiments, the marker may be a chemically altered region, such as a bleached region, of the background layer. In yet other embodiments, the marker may be created by depositing material onto the background layer. The deposited material may, for example, be photoluminescent or reflective, among others.

Calibration target 54 may meet a first requirement as described in this paragraph. The calibration target may contain at least one optically-detectable marker of well-defined size, or an arrangement of at least two markers of well-defined period (or spacing), to enable measurement of the total magnification of the light-field system for a range of z-positions. The maximum suitable size of the marker or period of the arrangement still allows the marker or arrangement to be imaged in its entirety in a single microlens subimage over the entire axial range of z-positions being expressly calibrated. The minimum size of the marker or arrangement may be determined by the lateral resolution of the light-field system. More specifically, the marker or arrangement should be large enough that it can be resolved for all expressly calibrated z-positions in object space.

Calibration target 54 may meet a second requirement as described in this paragraph. The calibration target may contain a particular instance of a marker, or a particular instance of a feature defined by at least two markers, that is imaged in at least two microlens subimages of a light-field image and whose position can be determined with pixel resolution or better, to enable measurement of the microlens magnification for a plurality of z-positions in object space. The position may, for example, be an edge, corner, or center of mass of the marker or feature. The type or instance of marker or feature used for measuring total magnification may be the same as or different from that used for measuring microlens magnification.

The calibration target may satisfy the first and second requirements described above by containing only one instance of a single type of marker, multiple copies of only one type of marker, or multiple copies of at least two different types of distinguishable markers, among others. For example, the calibration target may have a single periodic arrangement or a superposition of two or more different periodic arrangements formed by copies of one or more types of markers. In the case of two periodic arrangements that are superposed, the period of at least one of the arrangements should be accurately known and this structure should fulfill the first and second requirements. The periods of the different arrangements do not have to have a well-defined relationship with one another provided that the first and second requirements above are fulfilled.

The calibration target does not need to cover the entire field of view. It is sufficient if the relevant marker or marker arrangement of known size can be imaged in two microlens images over the entire range of relevant z-positions. To be able to determine local aberrations in the magnification parameters and to increase accuracy, it can be advantageous to have the markers of the calibration target thereof distributed or extending across most or all of the field of view. In other words, at least one marker of the calibration target may be represented in at least 50%, 75%, 80%, 90%, or all of the subimages of each light-field image captured of the calibration target, in order to calibrate a light-field imaging system.

Figure 7:
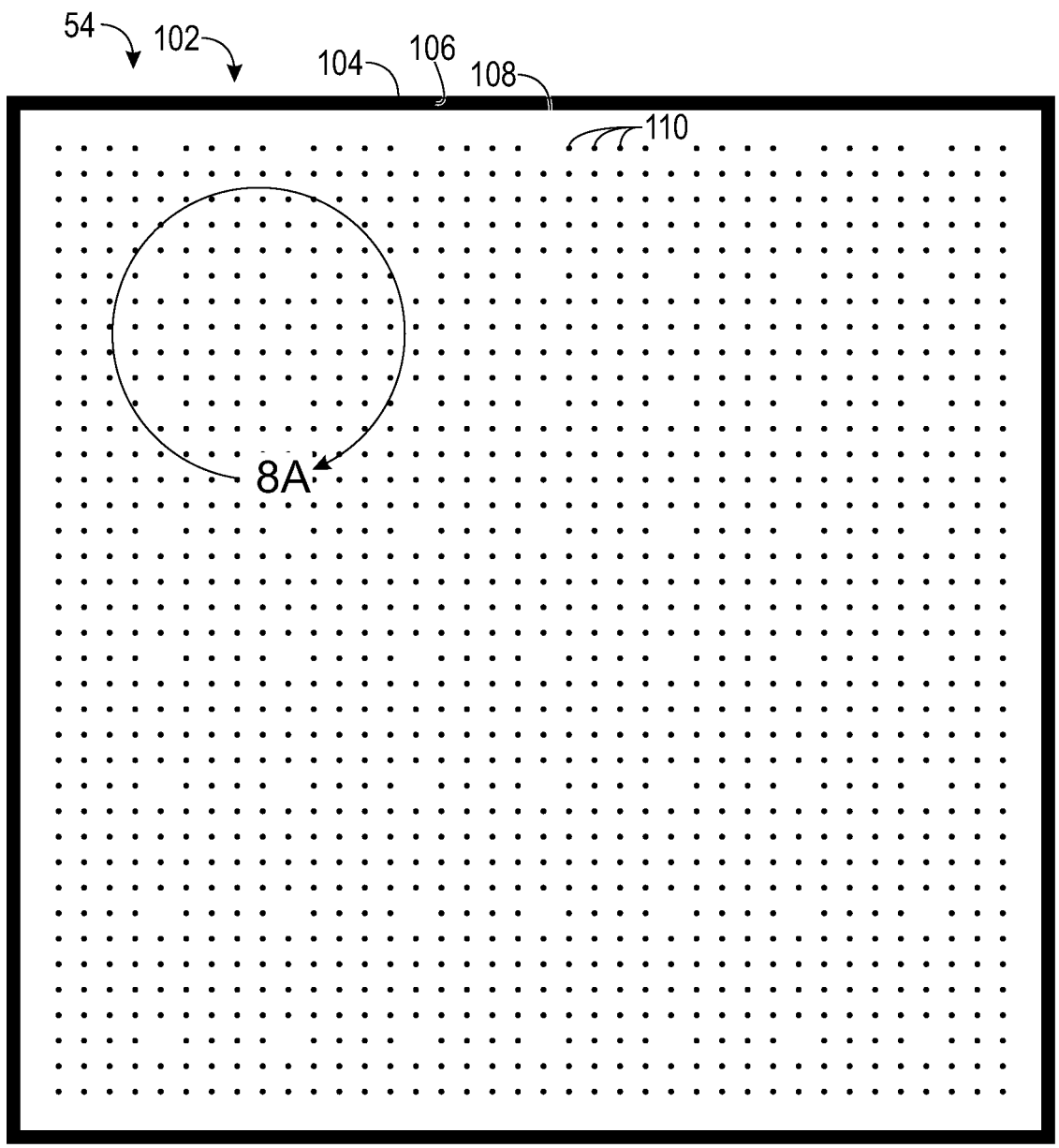
FIG. 7 is a plan view of an exemplary calibration target for the light-field imaging system of FIG. 1, with light-transmissive regions shown in black and light-blocking regions shown in white.
Figure 8A:
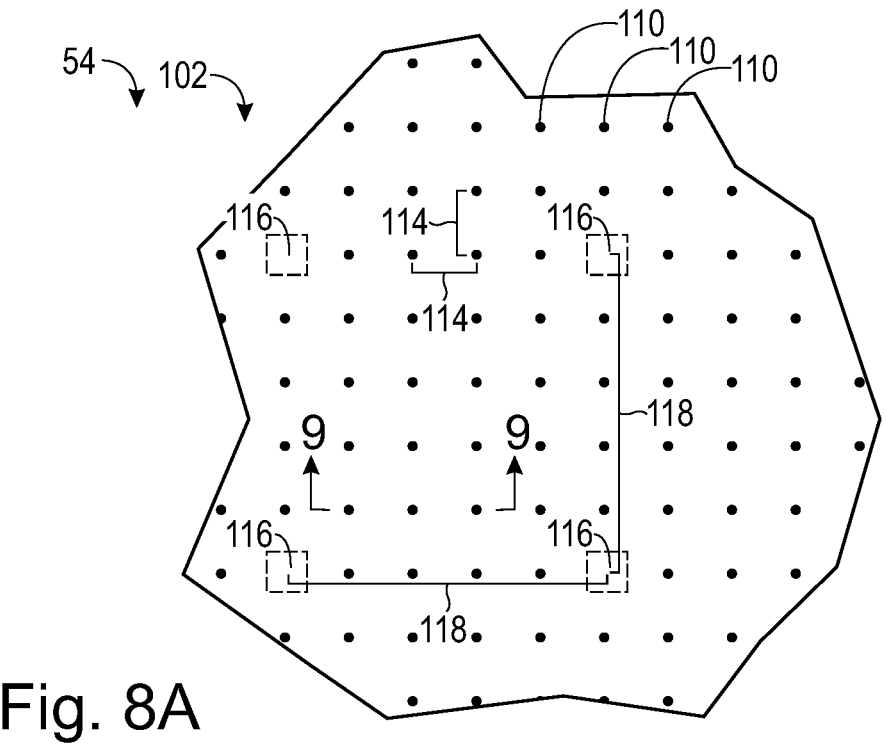
FIG. 8A is a fragmentary view of the calibration target of FIG. 7, taken generally around the region indicated at "8A" in FIG. 7.
Figure 8B:
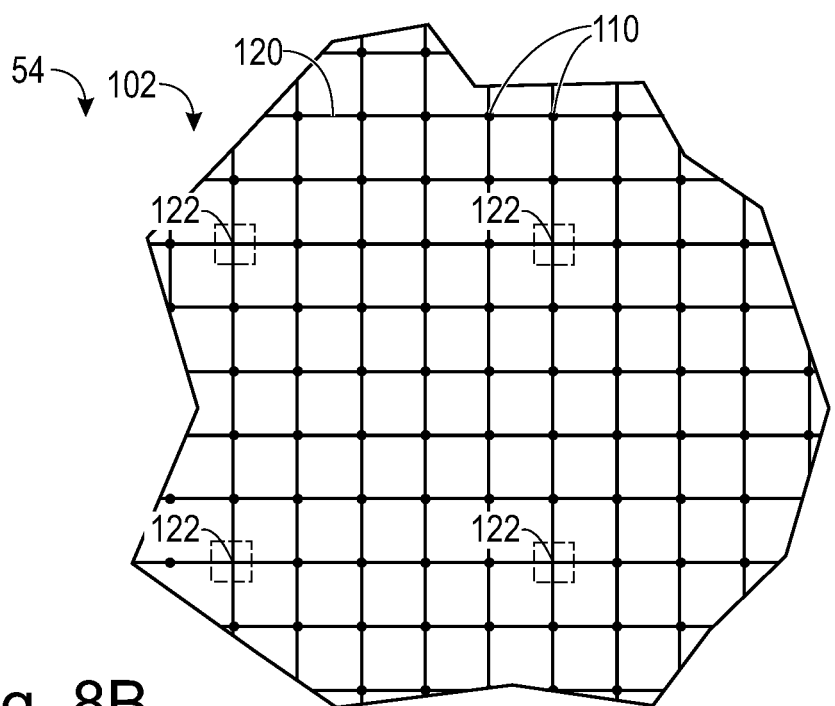
FIG. 8B is the fragmentary view of FIG. 8A taken with a marker-defined rectangular grid superimposed on the calibration target.
Figure 9:
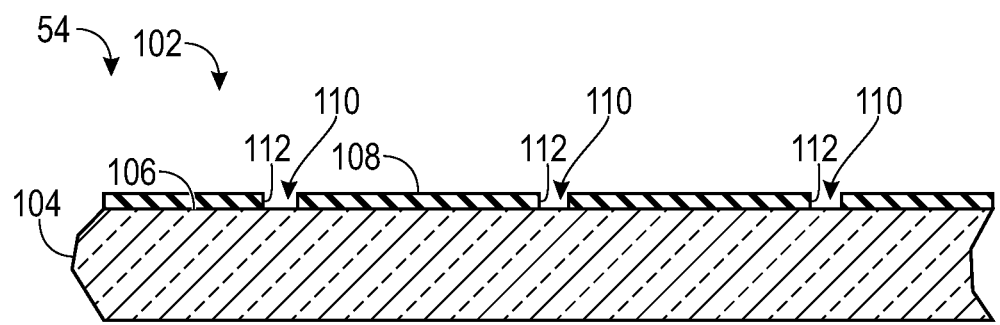
FIG. 9 is a sectional view of the calibration target of FIG. 8A, taken generally along line 9-9 of FIG. 8A.

Illustrative calibration target 102 is shown in FIGS. 7, 8A, 8B, and 9, with light-transmissive regions represented in black and light-blocking regions in white (except in FIG. 9). The calibration target may include a flat substrate 104 having a planar top or bottom surface 106. A background layer 108 may be bonded or otherwise attached to surface 106. The background layer forms or supports at least one or a plurality of optically-detectable markers 110, each having any suitable combination of the properties described above. In the depicted embodiment, markers 110 are created by pinholes 112, which are optically-transmissive for the wavelength(s) of optical radiation being used for illumination and/or imaging (see FIG. 9). Moreover, substrate 104 may be substantially transmissive or transparent for the optical radiation, and background layer 108 may be substantially non-transmissive (i.e., blocking or opaque) for the optical radiation. In some embodiments, substrate 104 may be omitted from calibration target 102, such that background layer 108 and/or calibration target 102 is only a single layer.

To be able to determine the magnification parameters with high accuracy (by averaging several measurements) and to be able to characterize local aberrations from the average (e.g., due to optical aberrations), calibration target 102 may include a superposition of at least two periodic arrangements that extend over the entire field of view. For example, in FIG. 8A, two periodic arrangement are visible, namely, a first periodic arrangement of markers 110 defining a marker period 114 (which may be the same along a pair of orthogonal lateral axes), and a second periodic arrangement of features 116 (indicated generally with dashed boxes), where markers 110 are periodically absent. Features 116 define a feature period 118, which may be the same along a pair of orthogonal lateral axes. FIG. 8B shows a rectangular grid 120 defined by the first periodic arrangement of markers 110 and superimposed on the calibration target. Markers 110 may be periodically absent from nodes 122 of grid 120, as shown in FIG. 8B, to create the second periodic arrangement. In other embodiments, a different type of marker may be present at these nodes (e.g., see Example 1). In other embodiments, the second periodic arrangement may be offset from grid 120 and/or may have a feature period 118 that is unrelated to the node spacing of grid 120.

Marker period 114 may be utilized to determine total magnification. The period may be optimized so that multiple neighboring pairs of markers 110 are imaged by each microlens for each z-position, which may allow the total magnification, as well as any local aberrations thereof, to be determined with high accuracy. In some cases, at least 2, 3, 4, or more instances of marker period 114 may be imaged in each lateral dimension per microlens image.

Calibration target 102 has a two-dimensional array of markers 110 with a fixed period, which can be used to determine $M_{Total}((z, \vec{x}''_k, \vec{y}''_k)$ (i.e., the total magnification as a function of z-position and microlens position), and that fulfills the first requirement described above. In this periodic structure, every n-th marker 110 is missing (e.g., where n is at least 2, 3, 4, 5, or more). These missing markers 110 constitute the second periodic feature 116 that is used to determine the magnification of a microlens as a function of z-position and that fulfills the second requirement described above. The exact position of each node 122 of grid 120 at which a marker 110 is missing can be determined by interpolation between (or extrapolation from) neighboring grid nodes to high precision. If markers 110 are of similar size or smaller than the diffraction-limited resolution, the point spread function of the system can also be extracted.

The periodic arrangement of a feature 116 used to determine a value(s) for microlens magnification fulfills the second requirement described above. The period of the feature generally is selected such that the correspondence of a particular instance of the feature in neighboring subimages 134 is uniquely defined. In order to fulfill this criterion, it is sufficient if only one instance of feature 116 is imaged by each microlens. If multiple instances of the feature are imaged by each microlens, then the period should be selected such that the correspondence between instances of the feature in neighboring views can be established through simple assumptions (e.g., that the correct value for $M_{ML}$ is the one closest to zero out of all possible values for $M_{ML}$ extracted from all possible combinations of correspondences between two sub-images).

Various other calibration targets may be suitable for the light-field imaging system, and may fulfill the first and second requirements described above. For example, the calibration target may include only a single instance of a marker 110, such as a circle, of defined size for determining $M_{Total}(z\vec{x}''_k, \vec{y}''_k)$. The center of mass of the circle can be used to determine $M_{ML}(z)$. In other examples, the calibration target may have markers forming a periodic line grating with known period to allow determination of $M_{Total}(z, \vec{x}''_k, \vec{y}''_k)$. To determine $M_{ML}(z)$, a corner of one line of the grating can be used.

V. Methods of Calibration and Mapping

This section describes exemplary methods of calibrating a light-field microscope and mapping between light-field space and object space after calibration. The method steps described in the section may be performed in any suitable order and combination, using any of the system components, calibration targets, and/or other aspects of the present disclosure. Each of the methods steps disclosed herein may be performed by, and/or under the control of, a computer. The method steps are exemplified with calibration target 102 and an embodiment of light-field imaging system 50 equipped with a ten-by-ten array 72 of microlenses 74; see FIGS. 10-14 (also see FIGS. 1, 2, and 7-9).

A calibration target may be placed on stage 56 of light-field imaging system 50 and located at a relevant z-position in object space. In the relevant z-position, the calibration target intersects a volume of interest within object space where a sample or other object of interest will be placed for imaging. For calibration, a z-stack of light-field images of the calibration target may be recorded. More specifically, a respective light-field image of the calibration target may be captured with an image sensor 76 of the light-field imaging system at each of at least two, three, or more relevant z-positions of the calibration target in object space by adjusting the location of stage 56 or collection module 66 of light-field microscope 52 along the z-axis (i.e., parallel to optical axis 60). The lateral position (orthogonal to optical axis 60) of the calibration target may or may not be the same for the captured light-field images, but there is generally no motivation to change this lateral position during calibration with the same calibration target.

Figure 10:
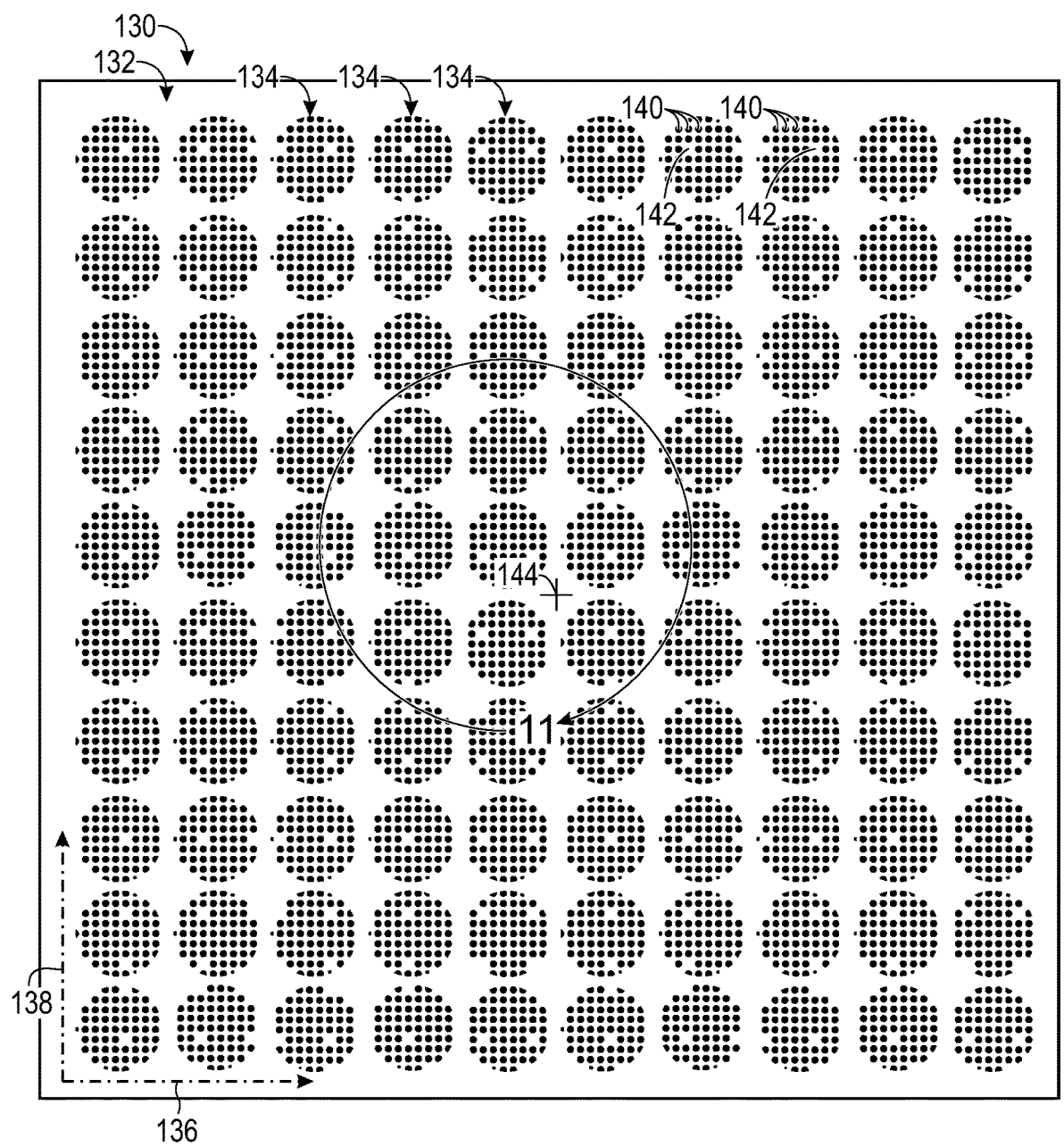
FIG. 10 is an exemplary negative light-field image of the calibration target of FIG. 7 that may be captured with a light-field imaging system.
Figure 11:
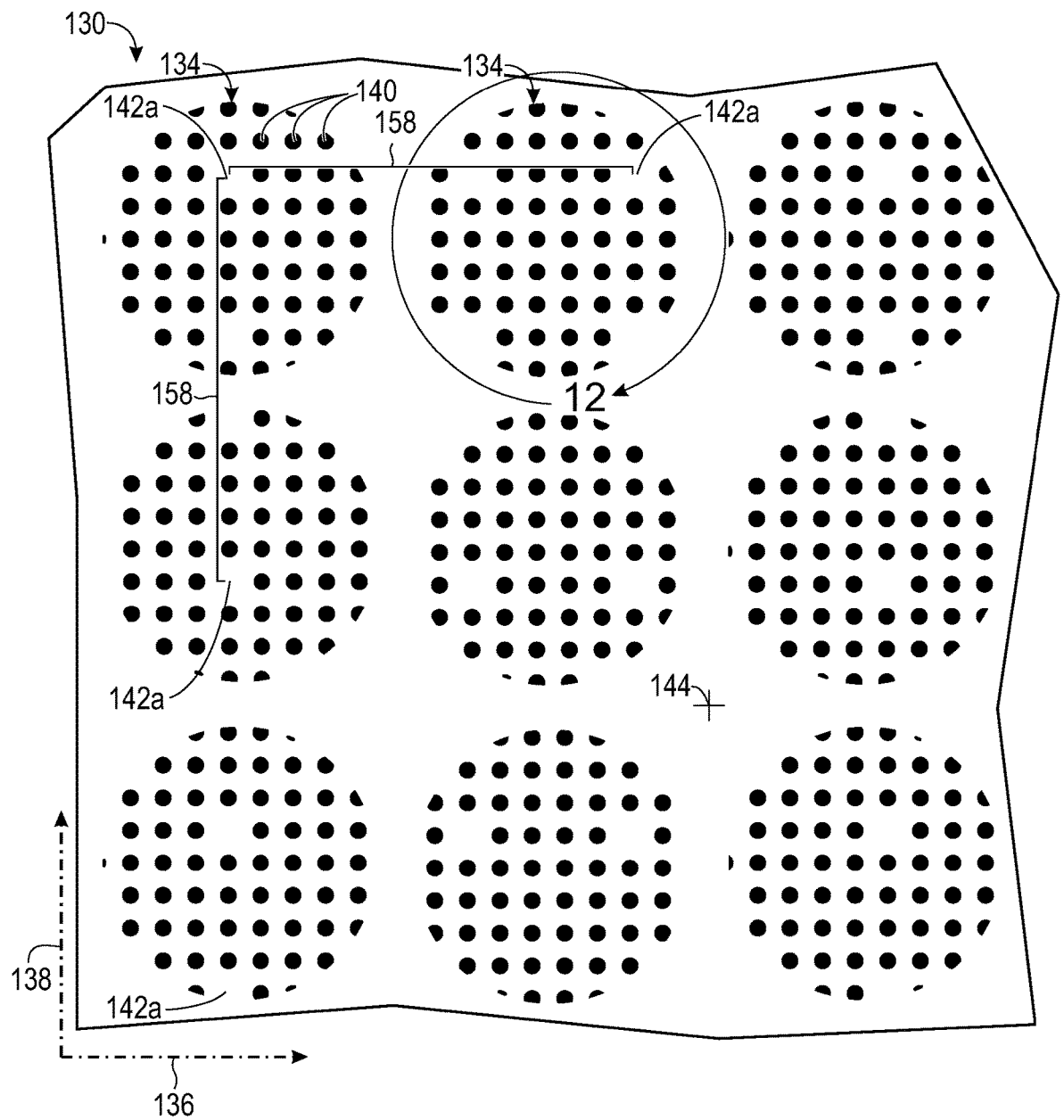
FIG. 11 is a magnified, fragmentary view of the negative light-field image of FIG. 10, taken generally around the region indicated at "11" in FIG. 10.
Figure 12:
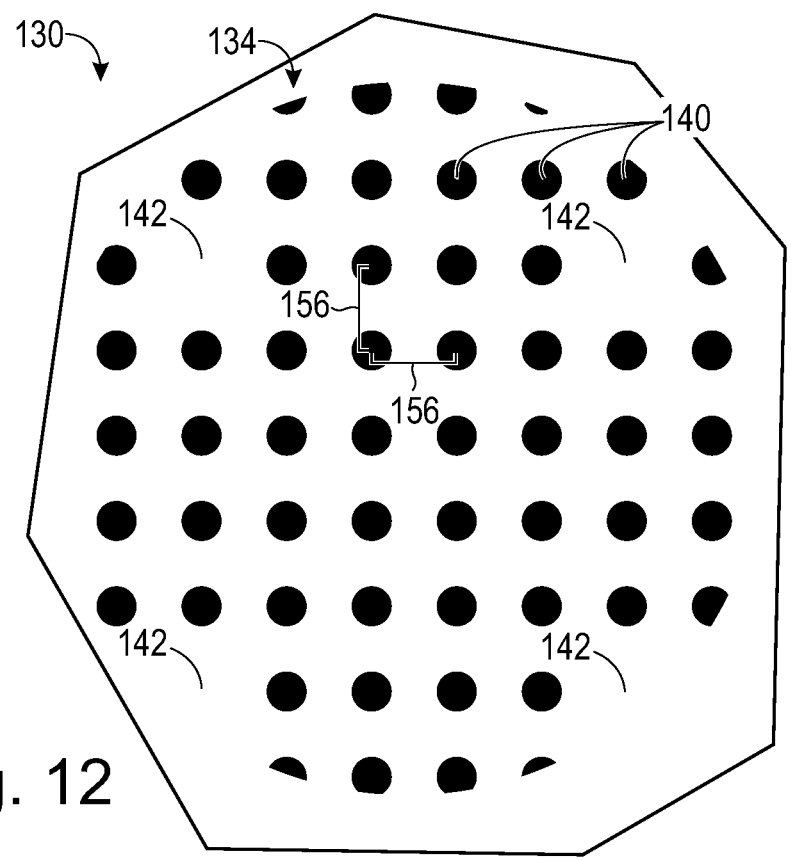
FIG. 12 is another magnified, fragmentary view of the negative light-field image of FIG. 10, taken generally around the region indicated at "12" in FIG. 11 at one of the separate subimages present in the negative light-field image of FIG. 10.

FIGS. 10-12 show an exemplary negative light-field image 130 of calibration target 102 that may be captured by image sensor 76 of light-field imaging system 50 while the calibration target is supported by stage 56 at one of the z-positions (also see FIGS. 7-9). Light-field image 130 is composed of an array 132 of subimages 134, with each subimage 134 corresponding to, and produced by, a different microlens 74 of array 72. Subimages 134 may be separate from one another (i.e., nonoverlapping) to facilitate subsequent image processing, or may overlap slightly. The separation distance between neighboring subimages 134 generally is minimized to maximize the amount of image data contained by each subimage.

Subimages 134 represent overlapping views of calibration target 102 and are arranged along lateral axes 136, 138 defined by light-field image 130. Accordingly, a given marker 110 and/or feature 116 of calibration target 102 may be represented by a corresponding (imaged) marker 140 and/or (imaged) feature 142 in at least two neighboring subimages 134 along each axis 136, 138. For example, in the depicted embodiment, markers 110 and features 116 of calibration target 102 imaged more centrally in light-field image 130 each may be presented in about a three-by-three array of subimages 134, although in other embodiments, each marker/feature may be represented in a smaller or larger two-dimensional array of subimages 134 of light-field image 130.

The position of a given imaged marker 140 or imaged feature 142 shifts in adjacent subimages 134 along each axis 136, 138 due to parallax. The extent of this shift can be used to calculate the magnification of microlenses 74, as described elsewhere herein. FIG. 11 show how a feature 142a, representing the same instance of feature 116 in calibration target 102, shifts by about two columns of markers 140 between successive subimages along axis 136, and by about two rows of markers 140 between successive subimages along axis 138.

An optical axis may be defined for each light-field image. The actual intersection of the true optical axis with the microlens array and the light-field image generally is not known. Instead, a virtual (global) optical axis may be defined during preprocessing of the light-field image by any suitable method. For example, the light-field image may be centered and cropped such that the two central subimages in each lateral dimension meet exactly in the middle of the subimage array, i.e., where the four central pixels of the subimage array meet. This point may be defined as the point where a virtual optical axis intersects the orthogonal projection of the microlens array into light-field space. (It can be assumed that the virtual optical axis thus defined also intersects the physical microlens array at a point centered between four microlenses.) This definition of the optical axis can be sufficient for both calibration (where only distances in the light-field image are evaluated) as well as for mapping from light-field space into object space (e.g., based on Equation 1) (also see Section III). Mapping is sufficiently accurate with this definition of the optical axis because a shift between the true optical axis and the virtual optical axis corresponds to a global shift in object space, which is not important for most applications. FIGS. 10 and 11 show a virtual optical axis 144 in light-field image 130 defined according to this approach.

Figure 13:
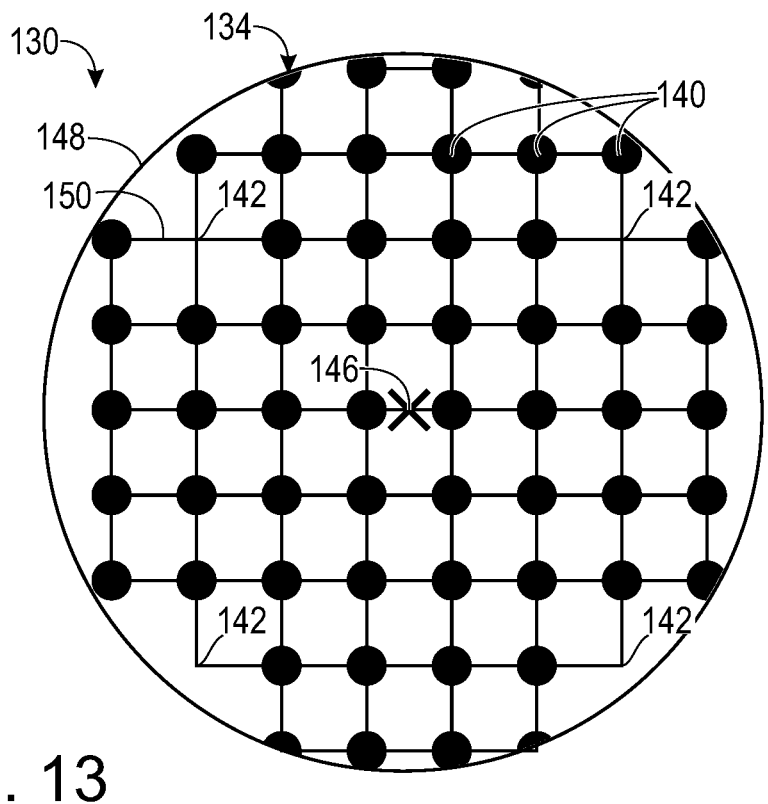
FIG. 13 is superimposed form of the subimage of FIG. 12 identifying features and attributes thereof.

Subimages of each calibration light-field image may be identified. For example, the center point, size, and/or boundary of each subimage may be determined by processing the light-field image. FIG. 13 shows one of subimages 134 for which a center 146 and a boundary 148 are identified for the subimage.

The positions of markers/features within each subimage 134 may be detected. For example, the center of mass or point of maximum intensity may be determined for each marker 140 (and/or feature 142, if the feature is created by a different type of marker from marker 140 (e.g., see Example 1)).

Figure 14:
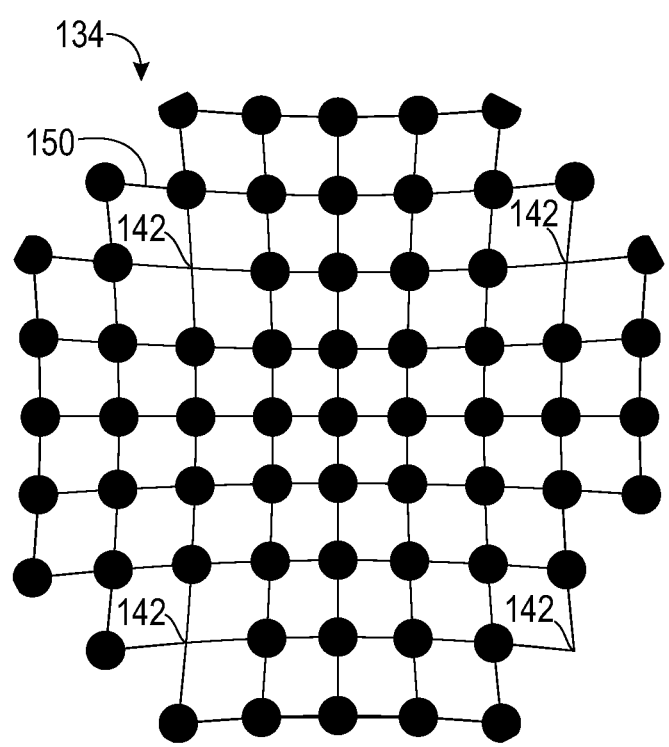
FIG. 14 is a superimposed form of a subimage similar to that of FIG. 12, except with the subimage exhibiting radial distortion produced by a corresponding microlens of a microlens array of a light-field imaging system.

A mesh may be created for each subimage by quadrangulation using the detected positions of markers/features. FIG. 13 shows an exemplary mesh 150 created by quadrangulation. Mesh 150 corresponds to a portion of grid 120 defined by calibration target 102. The mesh may be rectangular, as shown, if no substantial distortion is generated by the system optics (e.g., the microlens array). FIG. 14 shows an exemplary subimage 152 of calibration target 102 in which pincushion radial distortion is produced by the corresponding microlens 74 of microlens array 72. Here, mesh 150 is not rectangular. In other cases, the radial distortion may be barrel distortion.

Imaged features of the calibration target may be detected. For example, nodes of mesh 150 representing imaged features 142 (where markers 140 are missing from the periodic arrangement thereof) may be identified and their positions determined (see FIG. 13). In other embodiments, imaged features produced by a different type of marker (e.g., see Example 1) may be detected and their positions determined.

A total magnification of the light-field imaging system may be determined. The total magnification can be calculated according to Equation 11:

$$M_{Total} = \frac{Dist_{LF}}{Dist_{OB}} \quad (11)$$

Wherein $Dist_{LF}$ is the distance between two points within a subimage of a light-field image, and $Dist_{OB}$ is the distance between the same two points in object space. The two points are defined by the calibration target in object space and two-dimensional light-field space, and may be provided by a single marker of the calibration target (e.g., a characteristic dimension (such as diameter or length) of a marker of defined size), or a neighboring pair of markers (e.g., a center-to center or edge-to-edge distance between the pair of markers), among others. In exemplary embodiments, the distance in object space is known marker period 114 (e.g., see FIG. 8A) and the corresponding distance in two-dimensional light-field space is measured period 156 (see FIG. 12).

In some embodiments, measured period 156 may be determined by fitting the positions of imaged markers 140 to a regular grid. The period of the grid provides $Dist_{LF}$ for Equation 11.

A global total magnification can be determined. For example, the global total magnification can be calculated as the average of measured period 156 over known period 114.

Local aberrations can be determined with the resolution of about one period and can thus be incorporated into the reconstruction process (e.g., see Section III), such as by adopting a locally varying total magnification or by correcting the captured light-field image in a preprocessing step.

At least one microlens magnification may be determined. For example, an average microlens magnification for the microlens array may be determined, and then used for mapping from light-field space to object space, or microlens-specific magnifications may be determined and used for mapping. A magnification of the microlens array is determined by measuring the parallax between different views of the same object point of the calibration target. The views do not have to be provided by subimages that are adjacent to one another, as long as the same object point is imaged. For example, the microlens magnification can be calculated as shown in Equation 12:

$$M_{ML} = \frac{\Delta}{n \cdot d} \tag{12}$$

Where $\Delta$ is the parallax of the reference object point, n-1 is the number of microlens subimages between the two views under consideration and d is the period of the microlens array. Similarly, the microlens magnification can be determined according to Equation 10. For example, a distance 158 between a given feature 142a in neighboring subimages 134 may be determined (see FIG. 11), and a ratio of distance 158 and microlens pitch $d_{MLA}$ may be calculated. A value for the (nominal) pitch of the microlens array may be obtained from the manufacturer of the array, or may be measured by the user, among others.

The total and microlens magnification values obtained as described above, at defined z-positions, can then be interpolated or extrapolated to obtain corresponding magnification values at other z-positions not specifically calibrated.

A vignetting distribution may be measured. For example, the vignetting distribution may describe the intensity of imaged markers 140 according to lateral position. The intensity may be a peak intensity, total intensity, or the like, for each imaged marker.

A field distortion of each light-field image may be determined. The field distortion may be radial distortion, such as pincushion distortion or barrel distortion caused by individual microlenses 74 of microlens array 72 in corresponding subimages of the light-field image. Radial distortion for a given microlens may, for example, be calculated as a deviation of (i) the measured marker positions for a corresponding subimage from (ii) a least-square fitted regular grid defined by the marker positions. An average radial distortion may be calculated, or microlens-specific radial distortions may be used for mapping. The radial distortion may be accounted for in the mapping function (e.g., Equation 1) when mapping from light-field space to object space (i.e., from a light-field image captured of a sample or other object of interest). For example, the radial distortion may be accounted for using a correction factor that depends on the radial distance of a subimage point from the center of the microlens subimage. Global radial distortion by the objective also or alternatively can be evaluated, generally with a resolution on the order of the size of each microlens. The change in value for the average total magnification per microlens across the microlens array can be evaluated to determine global radial distortion.

A point spread function may be determined from at least one of the subimages of each calibration light-field image. For example, a deconvolution operation may be performed with an imaged marker 140 in a subimage and the corresponding marker 110 of the calibration target, to calculate a point spread function for the microlens that created the subimage. An average point spread function may be computed for the microlens array, for use with all of the subimages captured in a light-field image for mapping into object space. Alternatively, each microlens may be assigned a different point spread function to be used for mapping.

Geometrical mapping between object space and light-field image space may be performed based on first-order optics (collinear transformation), such as in Equation 1. This mapping may permit an object to be at least partially reconstructed by forward projection of a light-field image from light-field space to one or more planes of object space. The mapping alternatively, or in addition, may permit a light-field image (or portion thereof) to be reconstructed by backward projection of an object from object space to light-field space. Forward projection to form a two-dimensional image or to reconstruct an object in three dimensions may correct for distortion (e.g., radial distortion) produced by microlenses and/or another optical element(s) (e.g., the objective) of the imaging system. The forward projection alternatively, or in addition, may utilize at least one point spread function (e.g., an average point spread function for the microlenses) to reduce blurring.

VI. Examples

This section describes selected embodiments and aspects of the light-field imaging systems, calibration targets, calibration methods, and mapping methods of the present disclosure. These embodiments and aspects are intended for illustration only and should not limit the entire scope of the present disclosure.

Example 1. Further Calibration Targets

This example describes further exemplary calibration targets 54 that may be suitable for the systems and methods of the present disclosure; see FIGS. 15-18.

Figure 15:
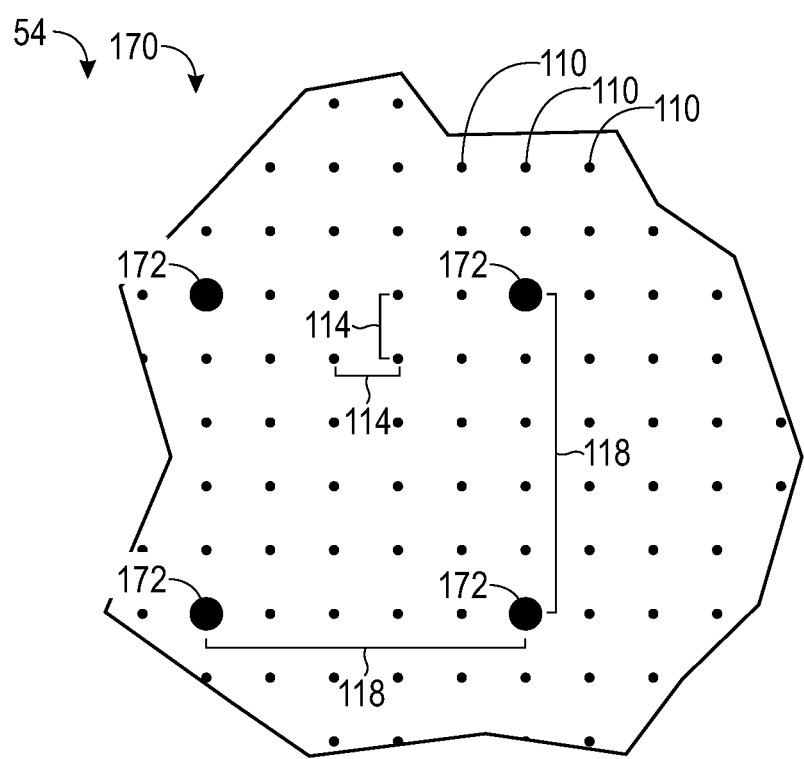
FIG. 15 is a fragmentary, plan view of another exemplary calibration target for calibrating a light-field imaging, with light-transmissive regions shown in black and light-blocking regions shown in white.

FIG. 15 shows an exemplary embodiment 170 of calibration target 54 having two types of periodic markers 110, 172 located at nodes of the same rectangular grid.

Calibration target 170 is similar to calibration target 102 (see FIGS. 7 and 8A) except that marker 172 replaces feature 116 (which is created by the absence of any marker at a node of a grid defined by markers 110). Each copy of marker 172 has a size and/or shape that makes it optically distinguishable from each copy of marker 110, and may be repeated periodically to define a feature period 118 for the marker.

Figure 16:
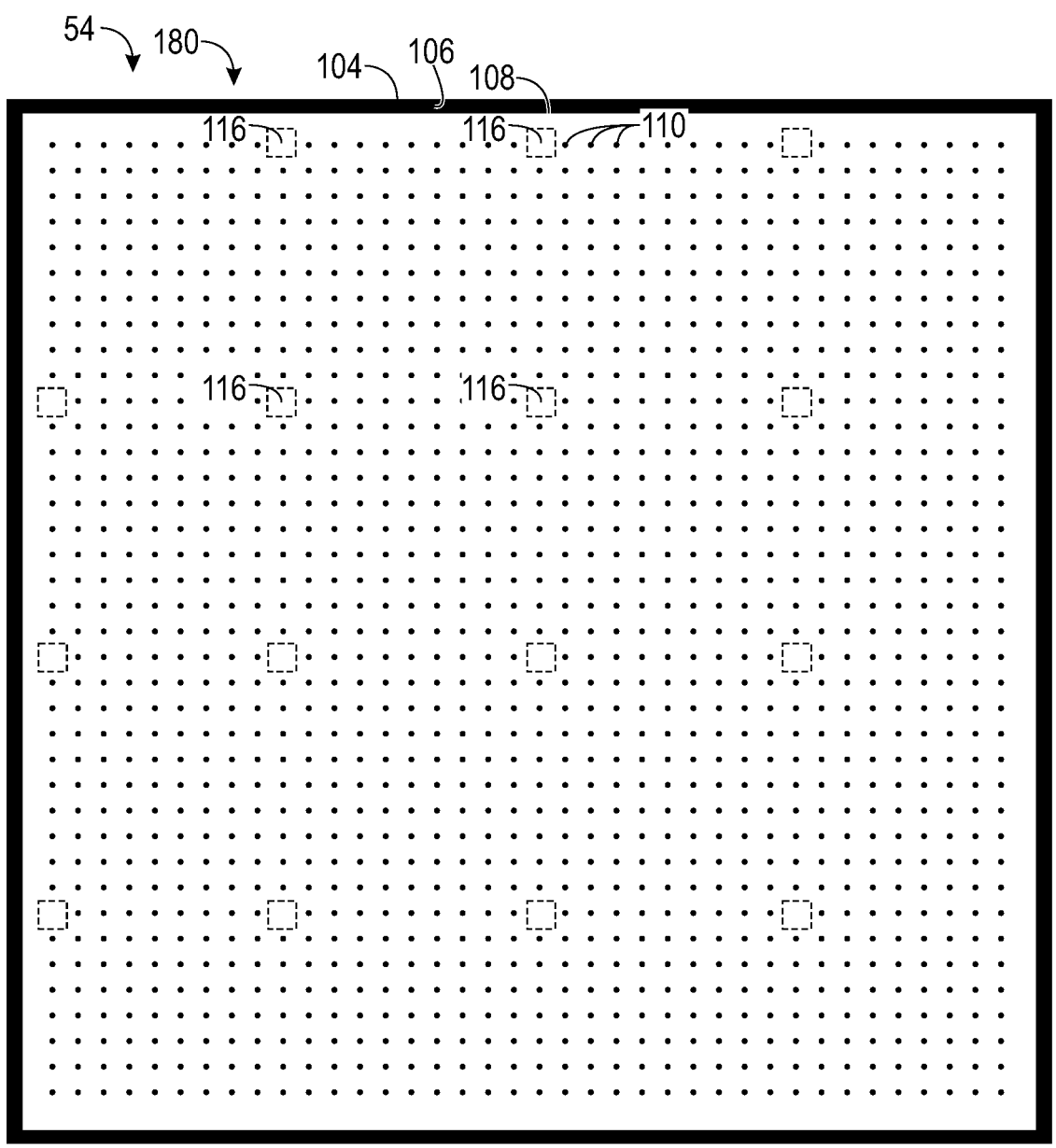
FIG. 16 is a plan view of yet another exemplary calibration target for calibrating a light-field imaging system.

FIG. 16 shows another exemplary embodiment 180 of calibration target 54 having only a single type of marker 110. Calibration target 180 is the same as calibration target 102 except that every tenth marker 110 is missing, instead of every fifth marker, to form features 116.

Figure 17:
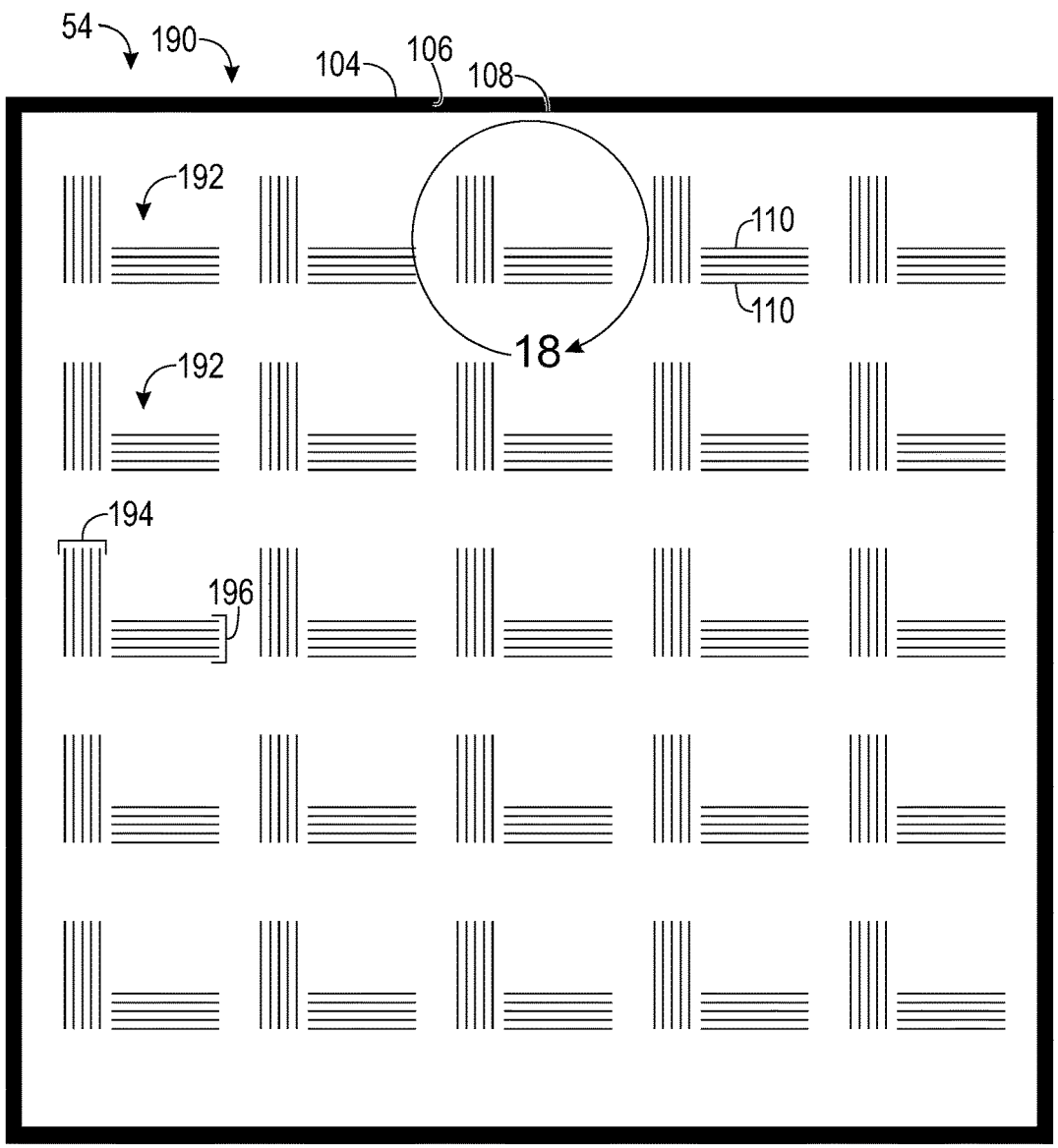
FIG. 17 is a plan view of still another exemplary calibration target for calibrating a light-field imaging system, with light-transmissive regions shown in black and light-blocking regions shown in white.
Figure 18:
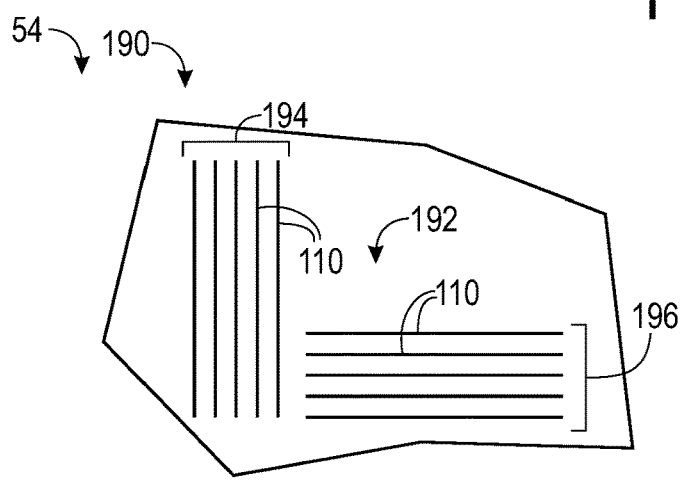
FIG. 18 is a fragmentary view of the calibration target of FIG. 17, taken generally around the region indicated at "18" in FIG. 17.

FIGS. 17 and 18 show yet another exemplary embodiment 190 of calibration target 54. Calibration target 54 has a repeat unit 192 composed of two sets of gratings 194, 196 arranged perpendicular to one another. In other embodiments, only one unit 192 may be provided by the calibration target.

Example 2. Calibration Data

Figure 19:
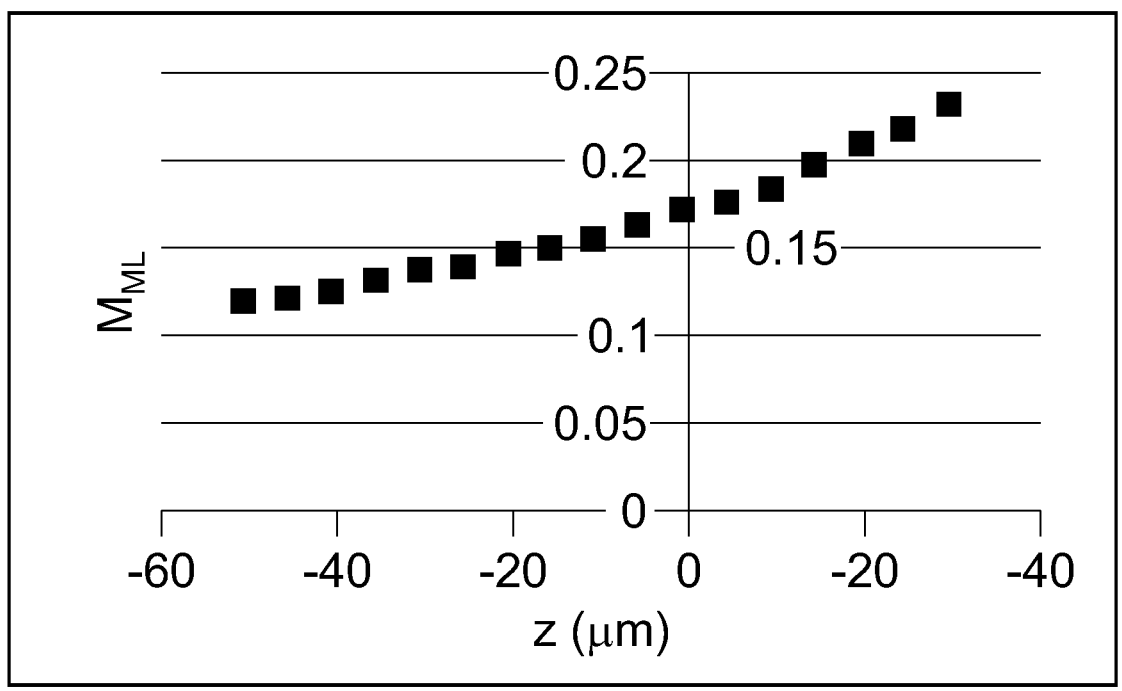
FIGS. 19 and 20 are graphs plotting magnification values as a function of z-position, measured with physical embodiments of a calibration target and a light-field microscope.
Figure 20:
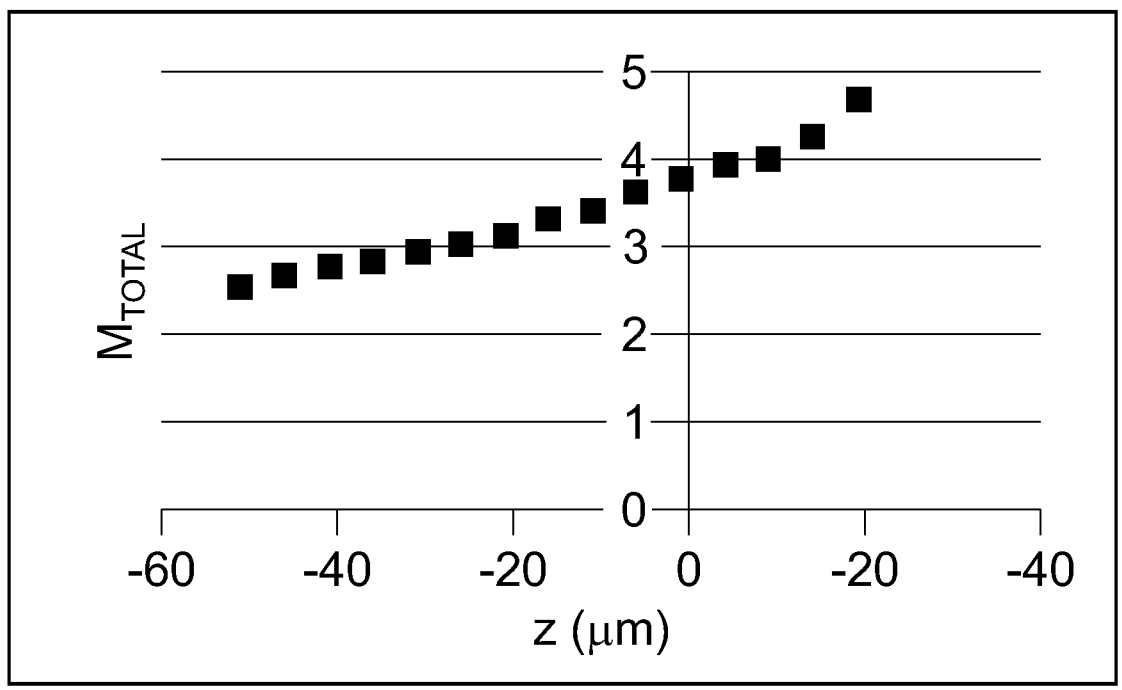

This example describes total and microlens magnification values measured as a function of z-position with working embodiments of a light-field microscope and a calibration target; see FIGS. 19 and 20.

The measured magnification values for each magnification parameter M(z) may be fitted to a function of the form shown below in Equation 13 to allow extrapolation and interpolation to other z-positions not expressly calibrated:

$$M(z) = \frac{1}{a \cdot z + b} \quad (13)$$

Where a and b are constants. Other fit functions may be suitable instead.

Example 3. Selected Embodiments

This example describes selected embodiments of the present disclosure as a series of indexed paragraphs.

Paragraph 1. A method of calibrating a light-field imaging system having a lens array (e.g., a microlens array) and an image sensor, the method comprising: (a) capturing a z-stack of light-field images of a calibration target using the image sensor, while the calibration target is located at a plurality of different z-positions; and (b) determining a total magnification of the light-field imaging system and a lens magnification of the lens array from each light-field image of the z-stack, optionally the imaging system has a stage Paragraph 2. The method of paragraph 1, further comprising calculating a point spread function as a function of the z-position of the calibration target using the z-stack of light-field images.

Paragraph 3. The method of paragraph 2, wherein each light-field image of the z-stack includes a plurality of subimages, and wherein calculating a point spread function includes calculating an average point spread function from the plurality of subimages of the light-field image.

Paragraph 4. The method of paragraph 2 or 3, wherein the step of calculating a point spread function includes performing a deconvolution operation on at least a portion of each light-field image of the z-stack.

Paragraph 5. The method of any of paragraphs 1 to 4, further comprising determining a radial distortion for at least one lens of the lens array as a function of the z-position of the calibration target using the z-stack of light-field images.

Paragraph 6. The method of paragraph 5, wherein the radial distortion is an average radial distortion for lenses of the lens array as a function of the z-position of the calibration target.

Paragraph 7. The method of any of paragraphs 1 to 6, wherein determining a lens magnification uses a pitch of the lens array to calculate at least one lens magnification for the lens array for each of the z-positions.

Paragraph 8. The method of any of paragraphs 1 to 7, wherein the calibration target has at least one type of marker arranged to form a first periodic repeat and a second periodic repeat, wherein the first periodic repeat is used to determine the total magnification at each of the z-positions, and wherein the second periodic repeat is used to determine at least one lens magnification at each of the z-positions.

Paragraph 9. The method of paragraph 8, wherein each light-field image of the z-stack is composed of a two-dimensional array of subimages, and wherein a period of the first periodic repeat in the subimages is smaller than a diameter of each subimage.

Paragraph 10. The method of paragraph 8 or 9, wherein the first periodic repeat is formed by a marker repeated a plurality of times to define a grid, and wherein the second periodic repeat is formed by a periodic absence of the marker from nodes of the grid.

Paragraph 11. The method of any of paragraphs 1 to 10, wherein the calibration target includes a two-dimensional array of pinholes.

Paragraph 12. The method of paragraph 11, wherein the pinholes are located at nodes of a grid.

Paragraph 13. The method of paragraph 12, wherein pinholes are periodically absent from nodes of the grid.

Paragraph 14. The method of any of paragraphs 1 to 13, wherein the calibration target has an array of markers each located at a different node of the same grid, wherein each of the markers is light-transmissive or light-emitting (e.g., photoluminescent), and wherein a subset of nodes within the grid are non-transmissive or non-emitting nodes having no light-transmissive or light-emitting marker.

Paragraph 15. The method of paragraph 14, wherein the non-transmissive or non-emitting nodes are repeated periodically in two dimensions within the grid.

Paragraph 16. The method of any of paragraphs 1 to 15, the method further comprising capturing a light-field image of an object; and projecting the light-field image into a plane of object space using a total magnification of the imaging system corresponding to plane and at least one lens magnification of the lens array corresponding to the plane.

Paragraph 17. The method of paragraph 16, wherein projecting uses at least one point spread function to reduce blurring, and wherein the at least one point spread function is calculated from one or more of the light-field images of the z-stack.

Paragraph 18. The method of paragraph 16 or 17, wherein projecting includes correcting for radial distortion produced by lenses of the lens array.

Paragraph 19. A light-field imaging system, comprising: (a) a calibration target; (b) an optional stage to support the calibration target; (c) a light source to illuminate the calibration target; (d) an objective to collect light from the illuminated calibration target;

(e) a lens array (e.g., a microlens array) downstream of the objective; (f) an image sensor to capture a light-field image of the calibration target; and (g) a computer configured to determine a total magnification and a lens magnification of the lens array from the light-field image.

Paragraph 20. The system of paragraph 19, wherein the computer is configured to calculate at least one point spread function from the light-field image.

Paragraph 21. The method of paragraph 20, wherein the computer is configured to perform a deconvolution operation on at least a portion of the light-field image to calculate the at least one point spread function.

Paragraph 22. The system of any of paragraphs 19 to 21, wherein the computer is configured to determine a radial distortion for at least one lens of the lens array from the light-field image.

Paragraph 23. The system of paragraph 22, wherein the computer is configured to determine an average radial distortion for lenses of the lens array from the light-field image.

Paragraph 24. The system of any of paragraphs 19 to 23, wherein the calibration target includes at least one type of marker arranged to form a first periodic repeat and a second periodic repeat, wherein the computer is configured to determine the total magnification using the first periodic repeat, and wherein the computer is configured to determine the lens magnification using the second periodic repeat.

Paragraph 25. The system of paragraph 24, wherein the first periodic repeat is formed by a marker repeated a plurality of times to define a grid, and wherein the second periodic repeat is formed by a periodic absence of the marker from nodes of the grid.

Paragraph 26. The system of paragraph 24 or 25, wherein the calibration target defines a two-dimensional array of pinholes.

Paragraph 27. The system of paragraph 26, wherein the two-dimensional array of pinholes is a rectangular array.

Paragraph 28. The system of paragraph 27, wherein the pinholes are located at nodes of a grid, and wherein pinholes are periodically absent from other nodes within the grid.

Paragraph 29. The system of paragraph 28, wherein the other nodes at which pinholes are periodically absent are not light-transmissive.

Paragraph 30. The system of any of paragraphs 26 to 29, wherein the pinholes of the two-dimensional array of pinholes have substantially the same size.

Paragraph 31. The system of any of paragraphs 19 to 30, wherein the calibration target has an array of markers located at nodes of the same rectangular grid, wherein each of the markers is light-transmissive or light-emitting, and wherein a subset of nodes within the rectangular grid lack one of the markers and are not light-transmissive or light-emitting.

Paragraph 32. A calibration target for a light-field imaging system, the calibration target comprising: a layer that substantially blocks transmission of optical radiation of at least one predefined wavelength and defining a plurality of openings transmissive for the optical radiation, the openings defining a grid; wherein each node of a periodic, two-dimensional subset of nodes within the grid (i) lacks an opening in the layer and is non-transmissive for the optical radiation, or (ii) has an opening of a different type that is distinguishable in size and/or shape from each of the plurality of openings.

Paragraph 33. The calibration target of paragraph 32, wherein the layer is bonded to a substrate that is transmissive for the optical radiation.

Paragraph 34. The calibration target of paragraph 32 or 33, wherein the at least one predefined wavelength includes ultraviolet radiation, visible light, and/or infrared radiation.

Paragraph 35. A method of project a light-field image of an object into object space using a light-field imaging system, the method comprising: (a) capturing a light-field image of the object supported in object space, optionally by a stage; and (b) mapping pixels of the light-field image geometrically to a plane of object space using a value for a total magnification of the microscope corresponding to the plane, and at least one value for a lens magnification corresponding to the plane.

Paragraph 36. The method of paragraph 35, wherein mapping uses a point spread function to reduce blurring.

Paragraph 37. The method of paragraph 35or 36, wherein the light-field imaging system includes an array of lenses, and wherein mapping corrects for radial distortion produced in the light-field image by the array of lenses.

Paragraph 38. The method of any of paragraphs 35to 37, wherein mapping includes reconstructing the object in three dimensions.

Paragraph 39. The method of any of paragraphs 35 to 38, further comprising defining a position of a virtual, global optical axis of the imaging system from a light-field image captured by an image sensor of the light-field imaging system, wherein mapping is performed with respect to the virtual, global optical axis in light-field space and object space.

Paragraph 40. The method of any of paragraphs 35 to 39, wherein the object includes a plurality of biological cells.

The term "exemplary" as used in the present disclosure, means "illustrative" or "serving as an example." Similarly, the term "exemplify" means "illustrate by giving an example." Neither term implies desirability nor superiority.

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure. Further, ordinal indicators, such as first, second, or third, for identified elements are used to distinguish between the elements, and do not indicate a particular position or order of such elements, unless otherwise specifically stated.

We claim:

1. A method of calibrating a light-field imaging system having a microlens array and an image sensor, the method comprising:
   capturing a z-stack of light-field images of a calibration target using the image sensor, while the calibration target is located at a plurality of different z-positions; and
   determining a total magnification of the light-field imaging system and a microlens magnification of the microlens array from each light-field image of the z-stack, wherein the calibration target has at least one type of marker arranged to form a first periodic repeat and a second periodic repeat, wherein the first periodic repeat is used to determine the total magnification at each of the z-positions, and wherein the second periodic repeat is used to determine at least one microlens magnification at each of the z-positions.

2. The method of claim 1, further comprising calculating a point spread function as a function of the z-position of the calibration target using the z-stack of light-field images.

3. The method of claim 1, further comprising determining a radial distortion for at least one microlens of the microlens array as a function of the z-position of the calibration target using the z-stack of light-field images.

4. The method of claim 1, wherein determining a microlens magnification uses a pitch of the microlens array to calculate at least one microlens magnification for the microlens array for each of the z-positions.

5. The method of claim 1, wherein the first periodic repeat is formed by a marker repeated a plurality of times to define a grid, and wherein the second periodic repeat is formed by a periodic absence of the marker from nodes of the grid.

6. The method of claim 1, wherein the calibration target includes a two-dimensional array of pinholes.

7. The method of claim 6, wherein the pinholes are located at nodes of a grid, and wherein pinholes are periodically absent from nodes of the grid.

8. The method of claim 1, wherein the calibration target has an array of markers each located at a different node of the same grid, wherein each marker is light-transmissive or light-emitting, and wherein a subset of nodes within the grid are non-transmissive or non-emitting nodes having no light-transmissive or light-emitting marker.

9. The method of claim 8, wherein the non-transmissive or non-emitting nodes are repeated periodically in two dimensions within the grid.

10. The method of claim 1, the method further comprising capturing a light-field image of an object; and projecting the light-field image into a plane of object space using a total magnification of the imaging system corresponding to the plane and at least one microlens magnification of the microlens array corresponding to the plane.

11. The method of claim 10, wherein projecting uses at least one point spread function to reduce blurring, and wherein the at least one point spread function is calculated from one or more of the light-field images of the z-stack.

12. The method of claim 10, wherein projecting includes correcting for radial distortion produced by microlenses of the microlens array.

13. A light-field imaging system, comprising:
a calibration target;
a light source to illuminate the calibration target;
an objective to collect light from the illuminated calibration target;
a microlens array downstream of the objective;
an image sensor to capture a light-field image of the calibration target; and
a computer configured to determine a total magnification and a microlens magnification from the light-field image,
wherein the calibration target includes at least one type of marker arranged to form a first periodic repeat and a second periodic repeat, wherein the computer is configured to determine the total magnification using the first periodic repeat, and wherein the computer is configured to determine the microlens magnification using the second periodic repeat.

14. The system of claim 13, wherein the computer is configured to calculate at least one point spread function from the light-field image.

15. The system of claim 13, wherein the computer is configured to determine a radial distortion for at least one microlens of the microlens array from the light-field image.

16. The system of claim 13, wherein the first periodic repeat is formed by a marker repeated a plurality of times to define a grid, and wherein the second periodic repeat is formed by a periodic absence of the marker from nodes of the grid.

17. A method of calibrating a light-field imaging system having a microlens array and an image sensor, the method comprising:
capturing a z-stack of light-field images of a calibration target using the image sensor, while the calibration target is located at a plurality of different z-positions, the calibration target including a two-dimensional array of pinholes located at nodes of a grid, and the pinholes being periodically absent from nodes of the grid; and
determining a total magnification of the light-field imaging system and a microlens magnification of the microlens array from each light-field image of the z-stack.

18. The method of claim 17, further comprising:
capturing a light-field image of an object; and
projecting the light-field image into a plane of object space using a total magnification of the imaging system corresponding to the plane and at least one microlens magnification of the microlens array corresponding to the plane.

19. The method of claim 17, further comprising calculating a point spread function as a function of the z-position of the calibration target using the z-stack of light-field images.

20. The method of claim 17, wherein determining a microlens magnification comprises using a pitch of the microlens array to calculate at least one microlens magnification for the microlens array for each of the z-positions.

* * * * *